United States Patent
Cormode et al.

(10) Patent No.: US 7,756,805 B2
(45) Date of Patent: Jul. 13, 2010

(54) METHOD FOR DISTRIBUTED TRACKING OF APPROXIMATE JOIN SIZE AND RELATED SUMMARIES

(75) Inventors: Graham R. Cormode, Summit, NJ (US); Minos N. Garofalakis, San Francisco, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1118 days.

(21) Appl. No.: 11/392,440

(22) Filed: Mar. 29, 2006

(65) Prior Publication Data

US 2007/0240061 A1   Oct. 11, 2007

(51) Int. Cl.
*G06F 17/00* (2006.01)
*G06N 5/02* (2006.01)

(52) U.S. Cl. ........................................... 706/46
(58) Field of Classification Search ............. 706/45–46, 706/48
See application file for complete search history.

(56) References Cited

U.S. PATENT DOCUMENTS

| | | | | |
|---|---|---|---|---|
| 2001/0052108 | A1* | 12/2001 | Bowman-Amuah | 717/1 |
| 2004/0236620 | A1* | 11/2004 | Chauhan et al. | 705/9 |
| 2006/0059253 | A1* | 3/2006 | Goodman et al. | 709/223 |
| 2006/0119853 | A1* | 6/2006 | Baumberg et al. | 356/445 |
| 2007/0136264 | A1* | 6/2007 | Tran | 707/4 |

OTHER PUBLICATIONS

Graham Cormode et al., Holistic Aggregates in a Networked World: Distributed Tracking of Approximate Quantiles, Jun. 16, 2005, SIGMOD ACM, 1-59593-060, 1-12.*
Graham Cormode et al., Sketching Streams Through the Net: Distributed Approximate Query Tracking, Sep. 2, 2005, Proceedings of the 31st VLDB Conference, Bell Labs, 13-24.*
Graham Cormode et al., An Improved Data stream Summary: The Count-Min sketch and its Applications, 2004, Rutgers University, 1-11.*
Amol Deshpande, Model-Driven Data Acquisition in Sensor Networks, 2004, Proceedings of the 30th VLDB Conference, 588-599.*
Graham Cormode et al., Holistic Aggregates in a Networked World: Distributed Tracking of Approximate Quantiles, Jun. 16, 2005, SIGMOD ACM, 1-59593-060, 1-12.*
Amol Deshpande, Model-Driven Data Acquisition in Sensor Networks, 2004, Proceedings of the 30th VLDB Conference, 588-599.*
N. Alon, P. B. Gibbons, Y. Matias, and M. Szegedy. "Tracking Join and Self-Join Sizes in Limited Storage". ACM PODS, 1999.

(Continued)

*Primary Examiner*—David R Vincent
*Assistant Examiner*—Benjamin Buss
(74) *Attorney, Agent, or Firm*—Wall & Tong, LLP

(57) ABSTRACT

A method of distributed approximate query tracking relies on tracking general-purpose randomized sketch summaries of local streams at remote sites along with concise prediction models of local site behavior in order to produce highly communication-efficient and space/time-efficient solutions. A powerful approximate query tracking framework readily incorporates several complex analysis queries, including distributed join and multi-join aggregates and approximate wavelet representations, thus giving the first known low-overhead tracking solution for such queries in the distributed-streams model.

18 Claims, 10 Drawing Sheets

---

PROCEDURE SITE UPDATE ($j, i, v, \pm 1, \epsilon, \delta, \theta, k_j$)
INPUT: SITE INDEX $j$, STREAM INDEX $i$, INSERTED/DELETED VALUE $v \in [U]$;
SKETCH ERROR, CONFIDENCE, AND LOCAL-DEVIATION PARAMETERS $\epsilon, \delta, \theta$;
"DISTRIBUTION FACTOR" $k_j$ FOR STREAM $i$.
1. UPDATE SKETCH ($sk(f_{i,j}), <i, v, \pm 1>$)    //update current and
2. UPDATE PREDICTED SKETCH ($sk^p(f_{i,j}(t))$)    //predicted sketches
3. IF $\|sk(f_{i,j}) - sk^p(f_{i,j}(t))\| > \frac{\theta}{\sqrt{k_i}} \|sk(f_{i,j})\|$ THEN
4.   COMPUTE SKETCH-PREDICTION MODEL predModel ($f_{i,j}$)
5.   SEND $\{i, j, sk(f_{i,j}), \text{predModel}(f_{i,j})\}$ TO COORDINATOR PROCEDURE ESTIMATE JOIN ($id(f_1), id(f_2)$)
INPUT: GLOBAL-STREAM IDENTIFIERS $id(f_1), id(f_2)$.
OUTPUT: APPROXIMATE ANSWER TO JOIN-SIZE QUERY $f_1 \cdot f_2$
1. FOR $i := 1$ TO 2 DO
2.   SET $sk^p(f_i(t)) := 0$
3.   FOR EACH $j \in sites(f_i)$ DO
4.     $sk^p(f_i(t)) := sk^p(f_i(t)) + sk^p(f_{i,j}(t))$
5. RETURN $sk^p(f_1(t)) \cdot sk^p(f_2(t))$

OTHER PUBLICATIONS

N. Alon, Y. Matias, and M, Szegedy. "The Space Complexity of Approximating the Frequency Moments". ACM STOC, 1996.

Babcock and C. Olston. "Distributed Top-K Monitoring". ACM SIGMOD, 2003.

M. Charikar, K. Chen, and M. Farach-Colton. "Finding Frequent Items in Data Streams". ICALP, 2002.

G. Cormode and S.Muthukrishnan. "An improved data stream summary: The count-min sketch and its applications". LATIN, 2004.

G. Cormode, M. Garofalakis, S. Muthukrishnan, and R. Rastogi. "Holistic Aggregates in a Networked World: Distributed Tracking of Approximate Quantiles". ACM SIGMOD, 2005.

Cranor, T. Johnson, O. Spatscheck, and V. Shkapenyuk. "Gigascope: A Stream Database for Network Applications". ACM SIGMOND, 2003.

A. Das, S. Ganguly, M. Garofalakis, and R. Rastogi. "Distributed Set-Expression Cardinality Estimation". VLDB, 2004.

M. Datar, A. Gionis, P. Indyk, and R. Motwani. "Maintaining Stream Statistics over Sliding Windows". ACM-SIAM SODA, 2002.

A. Deshpande, C. Guestrin, S. R. Madden, J. M. Hellerstein, and W. Hong. "Model-Driven Data Acquisition in Sensor Networks". VLDB, 2004.

A. Dobra, M. Garofalakis, J. Gehrke, and R. Rastogi. "Processing Complex Aggregate Queries over Data Streams". ACM SIGMOD, 2002.

S. Ganguly, M. Garofalakis, and R. Rastogi. "Processing Data-Stream Join Aggregates Using Skimmed Sketches". EDBT, 2004.

P. B. Gibbons. "Distinct Sampling for Highly-Accurate Answers to Distinct Values Queries and Event Reports". VLDB, 2001.

A. C. Gilbert, Y. Kotidis, S. Muthukrishnan, and M. J. Strauss. "Surfing Wavelets on Streams: One-pass Summaries for Approximate Aggregate Queries". VLDB, 2001.

M. B. Greenwald and S. Khanna. "Space-Efficient Online Computation of Quantile Summaries". ACM SIGMOD, 2001.

M. B. Greenwald and S. Khanna. "Power-Conserving Computation of Order-Statistics over Sensor Networks". ACM PODS, 2004.

Internet traffic archive. (http://ita.ee.lbl.gov/), Accessed Jan. 9, 2006.

S. R. Madden, M. J. Franklin, J. M. Hellerstein, and W. Hong. "The Design of an Acquisitional Query Processor for Sensor Networks". ACM SIGMOD, 2003.

A. Manjhi, V. Shkapenyuk, K. Dhamdhere, and C. Olston. "Finding (Recently) Frequent Items in Distributed Data Streams". IEEE ICDE, 2005.

G. Singh Manku and R. Motwani. "Approximate Frequency Counts over Data Streams". VLDB, 2002.

C. Olston, J. Jiang, and J. Widom. "Adaptive Filters for Continuous Queries over Distributed Data Streams". ACM SIGMOD, 2003.

N. Thaper, S. Guha, P. Indyk, and N. Koudas. "Dynamic Multidimensional Histograms". ACM SIGMOD, 2002.

G. Cormode, M. Garofalakis. "Sketching Streams Through the Net: Distributed Approximate Query Tracking". Proceedings of the 31st VLDB Conference, Trondheim, Norway, 2005.

G. Cormode and S.Muthukrishnan. "What's Hot and What's Not: Tracking Most Frequent Items Dynamically". ACM PODS, 2003.

A. C. Gilbert, Y. Kotidis, S. Muthukrishnan, and M. J. Strauss. "How to Summarize the Universe: Dynamic Maintenance of Quantiles". VLDB, 2002.

N. Shrivastava, C. Buragohain, D. Agrawal, and S. Suri. "Medians and beyond: New aggregation techniques for sensor networks". ACM SenSys, 2004.

M. Thorup and Y. Zhang. "Tabulation Based 4-Universal Hashing with Applications to Second Moment Estimation". ACM-SIAM SODA, 2004.

Pending patent application, U.S. Appl. No. 11/302,387, filed Dec. 13, 2005.

* cited by examiner

PROCEDURE SITE UPDATE $(j, i, v, \pm 1, \epsilon, \delta, \theta, k_j)$
INPUT: SITE INDEX $j$, STREAM INDEX $i$, INSERTED/DELETED VALUE $v \in [U]$;
SKETCH ERROR, CONFIDENCE, AND LOCAL-DEVIATION PARAMETERS $\epsilon, \delta, \theta$;
"DISTRIBUTION FACTOR" $k_j$ FOR STREAM $i$.
1. UPDATE SKETCH $(sk(f_{i,j}), <i, v, \pm 1>)$  //update current and
2. UPDATE PREDICTED SKETCH $(sk^p(f_{i,j}(t)))$  //predicted sketches
3. IF $\|sk(f_{i,j}) - sk^p(f_{i,j}(t))\| > \frac{\theta}{\sqrt{k_i}} \|sk(f_{i,j})\|$ THEN
4.     COMPUTE SKETCH-PREDICTION MODEL predModel $(f_{i,j})$
5.     SEND $\{i, j, sk(f_{i,j}), \text{predModel}(f_{i,j})\}$ TO COORDINATOR

PROCEDURE ESTIMATE JOIN $(id(f_1), id(f_2))$
INPUT: GLOBAL-STREAM IDENTIFIERS $id(f_1), id(f_2)$.
OUTPUT: APPROXIMATE ANSWER TO JOIN-SIZE QUERY $f_1 \cdot f_2$
1. FOR $i := 1$ TO $2$ DO
2.     SET $sk^p(f_i(t)) := 0$
3.     FOR EACH $j \in \text{sites}(f_i)$ DO
4.         $sk^p(f_i(t)) := sk^p(f_i(t)) + sk^p(f_{i,j}(t))$
5. RETURN $sk^p(f_1(t)) \cdot sk^p(f_2(t))$

FIG. 3

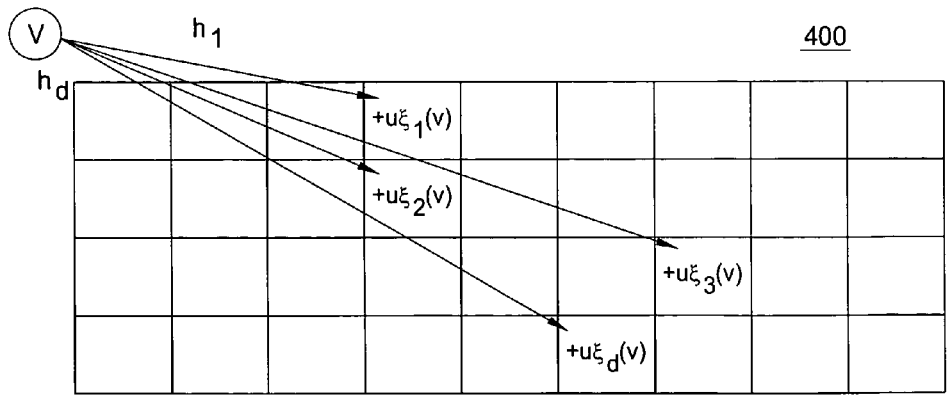

FIG. 4

| MODEL | INFO. | PREDICTED SKETCH |
|---|---|---|
| STATIC | 0 | $sk(f_{i,j}(t_{prev}))$ |
| LINEAR-GROWTH | 0 | $\frac{t}{t_{prev}} sk(f_{i,j}(t_{prev}))$ |
| VELOCITY/ ACCELERATION | $sk(v_{i,j})$ | $sk(f_{i,j}(t_{prev})) + \Delta t\, sk(v_{i,j}) + (\Delta t)^2 sk(a_{i,j})$ |

FIG. 5

PROCEDURE SITE UPDATE $(j, u, i)$
INPUT: SITE INDEX $j$ : UPDATE $u$ TO POSITION $i$
1. UPDATE $ss, sv, sa$ FROM $u, i, f, g, S[]$
2. $\Delta = t - t'$;
3. FOR $l = 1$ TO $d$ DO
4.     $est_l^2 = ss_l + 2\Delta sv_l + 2\Delta^2 sa_l + \Delta^2 (aa_l + 2\Delta va_l + \Delta^2 vv_l)$;
5.     UPDATE $skx_l^2$
6. IF ( MEDIAN$_l$ $est_l^2 > \theta^2 / k$ MEDIAN$_l$ $skx_l^2$) THEN
7.     COMPUTE NEW $sk_j^v$, $sk_j^a$;
8.     SEND NEW MODEL TO COORDINATOR;
9.     RECOMPUTE $aa, va, vv$;
10.     $t' = t$;

FIG. 6

METHOD FOR DISTRIBUTED TRACKING OF APPROXIMATE JOIN SIZE AND RELATED SUMMARIES

FIELD OF THE INVENTION

The present invention generally relates to the fields of database management, Internet management, network management and monitoring applications and, in particular, relates to tracking complex, aggregate queries in a distributed streams setting.

BACKGROUND OF THE INVENTION

Traditional database systems optimize for performance on one-shot query processing, yet emerging large-scale monitoring applications require continuous tracking of complex data-analysis queries over collections of physically distributed streams. Given the nature of these large-scale monitoring applications, their importance for security as well as daily operations and their general applicability, surprisingly little is known about solutions for many basic distributed monitoring problems. It would be beneficial to track distributed approximate queries in a manner that is simultaneously space/time-efficient and communication-efficient.

SUMMARY

Exemplary embodiments of the present invention continuously track approximate, quality answers to a broad, general class of complex aggregate queries over a collection of distributed data streams.

One embodiment is a method for tracking, where a number of monitoring sites monitor local update streams. The local update streams are part of a global data distribution in a distributed system. Each monitoring site sends a state update message to a coordinator, only when a local distribution differs from a predicted distribution by more than a predetermined amount. The state update message includes a predicted sketch. The coordinator provides an approximation based on the state update messages from the monitoring sites. In one embodiment, each monitoring site tracks any deviation of the local distribution from the predicted distribution using a sketch prediction model, such as a static model, a linear-growth model, or a velocity/acceleration model. The monitoring sites may perform substantially continuously monitoring. The approximation may be an answer in response to a user query or may be computed substantially continuously.

Another embodiment is a system for tracking, including a number of monitoring sites and a coordinator. The monitoring sites monitor local update streams that are part of a global data distribution in a distributed system. Each monitoring site sends a state update message that includes a predicted sketch, only when a local distribution differs from a predicted distribution by more than a predetermined amount. The coordinator provides an approximation based on the state update messages from the monitoring sites. Each monitoring site may track any deviation of the local distribution from the predicted distribution using a sketch prediction model, such as a static model, a linear-growth model, or a velocity/acceleration model. The monitoring sites may perform substantially continuously monitoring. The approximation may be an answer in response to a user query or may be computed substantially continuously.

Another embodiment is a computer readable medium storing instructions for performing a method of tracking, where monitoring sites monitor local update streams that are part of a global data distribution in a distributed system. A state update message is sent from each monitoring site to a coordinator, only when a local distribution differs from a predicted distribution by more than a predetermined amount. The state update message includes a predicted sketch. Each monitoring site may track any deviation of the local distribution from the predicted distribution using a sketch prediction model, such as a static model, a linear-growth model, or a velocity/acceleration model. The monitoring sites may perform substantially continuously monitoring.

Another embodiment is a computer readable medium storing instructions for performing a method of tracking, where a state update message is received from each of a number of monitoring sites, only when a local distribution differs from a predicted distribution by more than a predetermined amount. The state update message includes a predicted sketch. Each state update message reflects local update streams that are part of a global data distribution system. A coordinator provides an approximation based on the state update messages from the monitoring sites. The approximation may be an answer in response to a user query or may be computed substantially continuously.

BRIEF DESCRIPTION OF THE DRAWINGS

The teachings of the present invention can be readily understood by considering the following detailed description in conjunction with the accompanying drawings, in which:

FIG. 3 shows an exemplary embodiment of pseudo code for processing stream updates and tracking local constraints at remote sites as well as providing approximate answers at the coordinator;

FIG. 4 illustrates the structure of an exemplary fast-AGMS sketch;

FIG. 5 is a table summarizing information for exemplary embodiments of the three prediction schemes: the static model, the linear growth model, and the velocity/acceleration model;

FIG. 6 shows pseudo code for an exemplary embodiment of a fast procedure for tracking updates at remote sites;

DETAILED DESCRIPTION OF THE INVENTION

Figure 1:
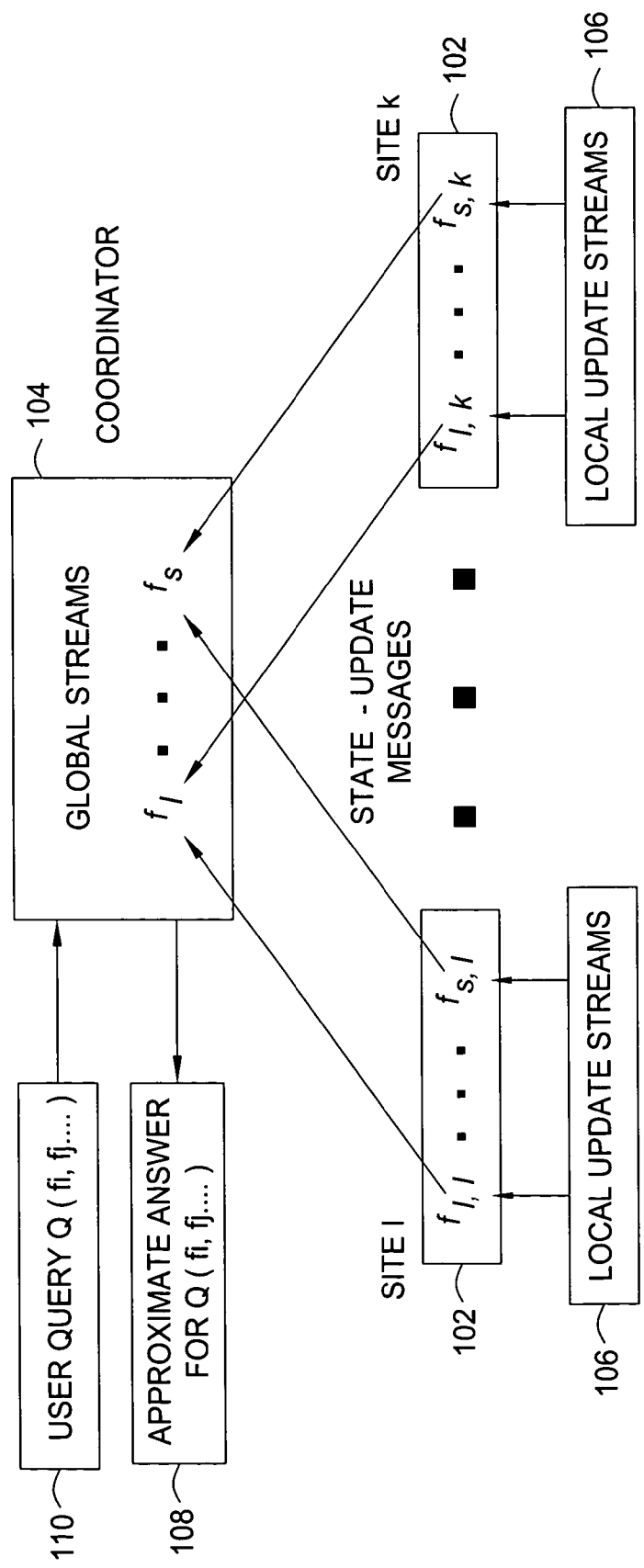
FIG. 1 is a block diagram showing an exemplary embodiment of a distributed stream processing architecture.

The present invention will primarily be described within the general context of exemplary embodiments of methods for distributed approximate query tracking. However, those skilled in the art and informed by the teachings herein will realize that the invention is generally applicable to any kind of database management, Internet management, or network management, and any kind of monitoring application, such as distributed data centers/web caches, sensor networks, power grid monitoring, monitoring habitat and environmental parameters, tracking objects, monitoring intrusions, trend analysis, monitoring customer usage patterns, etc.

While traditional database systems optimize for performance on one-shot query processing, emerging large-scale monitoring applications require continuous tracking of complex, data-analysis queries over collections of physically distributed streams. Thus, effective solutions have to be simultaneously space/time efficient (at each remote monitor site), communication efficient, (across the underlying communication network) and provide continuous, quality approximate query answers.

Exemplary embodiments of the present invention provide continuous tracking of a broad class of complex, aggregate queries in a distributed-streams setting. Exemplary embodiments maintain approximate query answers with error guarantees, while simultaneously optimizing the storage space and processing time at each remote site and the communication cost across the network. One embodiment is a method of distributed approximate query tracking that relies on tracking general-purpose randomized sketch summaries of local streams at remote sites along with concise prediction models of local site behavior in order to produce highly communication-efficient and space/time-efficient solutions. Another embodiment is a powerful, approximate query tracking framework that readily incorporates several complex analysis queries, including distributed join and multi-join aggregates and approximate wavelet representations, thus giving the first known low-overhead tracking solution for such queries in the distributed-streams model. Experiments with real data validated this approach, revealing significant savings over prior art solutions as well as analytical worst-case guarantees.

Introduction

Traditional data management applications typically require database support for a variety of one-shot queries, including lookups, sophisticated slice-and-dice operations, data mining tasks and so on. In a one-shot query, data processing is done in response to a posed query. This has led to a successful industry of database engines optimized for supporting complex, one-shot structured query language (SQL) queries over large amounts of data, Recent years, however, have witnessed the emergence of a new class of large-scale, event-monitoring applications that pose novel data management challenges. In one class of applications, monitoring a large-scale system is a crucial aspect of system operation and maintenance.

As an example, consider a network operations center (NOC) for an internet protocol (IP) backbone network of a large internet service provider (ISP). Such centers are typically impressive computing facilities that monitor fast sets of events at different layers of the network infrastructure that range from fiber cable utilizations to packet forwarding at routers to virtual private networks (VPNS) and higher-level transport constructs. The center continuously tracks and correlates usage information from a multitude of monitoring points in order to quickly detect and react to hot spots, floods, failures of links or protocols, intrusions, and attacks.

A different class of applications is one in which monitoring is the goal in itself, such as a wireless network of seismic, acoustic, and physiological sensors that are deployed for habitat, environmental, and health monitoring. An objective for such systems is to continuously monitor and correlate sensor measurements for trend analysis, detecting moving objects, intrusions, or other adverse events. Similar issues arise in other systems, such as satellite-based systems that do atmospheric monitoring for weather patterns.

Such monitoring applications have a number of common characteristics. First, monitoring is continuous, that is, real-time tracking of measurements or events is performed, not merely one-shot responses to sporadic queries. Second, monitoring is inherently distributed, that is, the underlying infrastructure comprises a number of remote sites (each with its own local data source) that can exchange information through a communication network. This also means that there are typically communication constraints owing to either network capacity restrictions (e.g., in IP-network monitoring, where the volumes of collected utilization and traffic data can be large) or power and bandwidth restrictions (e.g., in wireless sensor networks, where communication overhead is a factor in determining sensor battery life). Furthermore, each remote site may see a high-speed stream of data and has its own local resource limitations, such as storage space or processing time constraints. This is true for IP routers, which cannot store a log of all observed packet traffic at high network speeds, as well as for wireless sensor nodes, which, even though they may not observe large data volumes and typically have little memory onboard.

Another aspect of large-scale event monitoring is the need for effectively tracking queries that combine and/or correlate information (e.g., IP traffic or sensor measurements) observed across the collection of remote sites. For instance, tracking the result size of a join over the streams of fault/alarm data from two or more IP routers (e.g., with a join condition based on their observed timestamp values) can allow network administrators to effectively detect correlated fault events at the routers and, perhaps, also pinpoint the root causes of specific faults in real time. A join is the "workhorse" correlation operator, as known to one of skill in the relational field. Another example is the tracking of a two- or three-dimensional histogram summary of the traffic-volume distribution observed across the edge routers of a large ISP network (along axes such as time, source/destination IP address, etc.). Clearly, such a histogram could provide a valuable visualization tool for effective circuit provisioning, detection of anomalies, denial of service (DoS) attacks, and so on. Interestingly, when tracking statistical properties of large-scale systems, answers that are precise to the last decimal are typically not needed; instead, approximate query answers (with reasonable guarantees on the approximation error) are often sufficient, because typically indicators or patterns, rather than precisely defined events are sought. This allows an effective tradeoff between efficiency and approximation quality.

Exemplary embodiments of the present invention include methods for continuously tracking approximate, quality answers to a broad, general class of complex aggregate queries over a collection of distributed data streams. These exemplary embodiments have many advantages over the prior art, including communication-efficient and space-efficient approximate query tracking, time-efficient sketch-tracking algorithms, and extensions to other distributed streaming models.

Exemplary embodiments include the first known algorithms for tracking a broad class of complex, data-analysis queries over a distributed collection of streams to a specified accuracy. These tracking algorithms achieve communication and space efficiency through a combination of general-purpose, randomized sketches for summarizing local streams and concise, sketch-prediction models for capturing the update-stream behavior at local sites. Prediction models allow the exemplary embodiments to achieve a natural notion of stability, rendering communication unnecessary as long as local data distributions remain stable or at least predictable. The result is a powerful, general-purpose, approximate, query-tracking framework that readily incorporates several complex, data-analysis queries, including join and multi-join aggregates and approximate wavelet/histogram representations in one or more dimensions. Exemplary embodiments provide the first principled, low-overhead tracing solution for such queries in the distributed-streams model. In fact, the worst-case communication cost for simple cases of the protocols is comparable to that of a one-shot computation, while the space-requirement is not much higher than that of centralized, one-shot estimation methods for data streams.

Exemplary embodiments include time-efficient, sketch-tracking algorithms and extensions to distributed streaming models. For massive, rapid-rate data streams (e.g., monitoring high-capacity network links), the time needed to process each update (e.g., to maintain a sketch summary of the stream) becomes a critical concern. Traditional approaches that need to "touch" every part of the sketch summary can quickly become infeasible. The problem is further compounded in tracking schemes that need to track continuously the divergence of the sketch from an evolving sketch prediction. This problem is addressed by a novel structure for randomized sketches that allows small update and tracking times, regardless of the size of the sketch, while offering the same or improved space/accuracy tradeoffs, Furthermore, the distributed-tracking schemes are extended to (1) different data-streaming models that place more emphasis on recent updates to the stream (using either sliding-window or exponential-decay mechanisms) and (2) more complex, hierarchical-monitoring architectures, where the communication network is arranged as a tree-structured hierarchy of nodes, such as a sensornet routing tree.

Experimental results validated the approach of exemplary embodiments. A set of experiments was performed over real-life data to verify the benefits of exemplary embodiments in practical scenarios. The results demonstrated that the algorithms result in dramatic savings in communication, reducing overall communication costs by a factor of more than 20 for an approximation error of only about 10%. The use of sophisticated, yet concise, sketch-prediction models obtained the best results. Furthermore, novel schemes for fast, local sketch updates and tracking allowed each remote site to process many hundreds of thousands of updates per second, which matched even the highest-speed data streams.

FIG. 1 is a block diagram showing an exemplary embodiment of a distributed stream-processing architecture 100. This exemplary embodiment is a distributed-computing environment that includes a collection of a number, k, of remote sites 102 and a designated coordinator site 104. Streams of data updates 106 arrive continuously at remote sites 102, while the coordinator site 104 is responsible for generating approximate answers 108 to (possibly continuous) user queries 110 posed over the unions of remotely-observed streams (across all sites). This exemplary embodiment does not allow direct communication between remote sites 102; instead, as illustrated in FIG. 1, a remote site 102 exchanges messages only with the coordinator 104, providing it with state information on its (locally-observed) streams. This exemplary embodiment may be applied to a large class of applications, including network monitoring where a NOC is responsible for processing network traffic statistics (e.g., link bandwidth utilization, IP source-destination byte counts) collected at switches, routers, and/or element management systems (EMSs) distributed across the network.

Each remote site $102$ $j\in\{1, \ldots, k\}$ observes local update streams that incrementally render a collection of up to s distinct frequency distribution vectors (equivalently, multi-sets) $f_{1,j}, \ldots, f_{s,j}$ over data elements from corresponding integer domains $|U_i|=\{0, \ldots, U_i-1\}$, for $i=1, \ldots, s$, where $f_{i,j}[v]$ denotes the frequency of element $v\in[U_i]$ observed locally at remote site j. For example, in the case of IP routers monitoring the number of transmission control protocol (TCP) connections and user datagram protocol (UDP) packets exchanged between source and destination IP address, $[U_1]=[U_2]$ denotes the domain of 64-bit (source, destination) IP address pairs and $f_{1,j}, f_{2,j}$ captures the frequency of specific (source, destination) pairs observed in TCP connections and UDP packets routed through router j. The term $f_{i,j}$ denotes both the ith update stream 106 at site j 102 as well as the underlying element multi-set/frequency distribution. Each stream update 106 at remote site j 102 is a triple of the form $<i,v,\pm 1>$, denoting an insertion (+1) or deletion (−1) of element $v\in[U_i]$ in the $f_{i,j}$ frequency distribution (i.e., a change of ±1 in v's net frequency in $f_{i,j}$). All frequency distribution vectors $f_{i,j}$ in the distributed streaming architecture 100 change dynamically over time. When necessary, this dependence is made explicit using $f_{i,j}(t)$ to denote the state of the vector at time t (assuming a consistent notion of "global time" in the distributed system). The unqualified notation $f_{i,j}$ typically refers to the current state of the frequency vector.

Handling delete operations substantially enriches the distributed streaming model. For instance, it facilitates tracking over sliding windows of the streams by simply issuing implicit delete operations for expired stream items no longer in the window of interest at remote sites. Other exemplary embodiments include extensions to more complex, distributed-tracking architectures, where the underlying communication network is structured as a multi-level tree hierarchy, such as the routing trees typically built over sensornet deployments.

Problem Formulation

For each $i\in\{1, \ldots, s\}$, define the global frequency distribution vector $f_i$ for the ith update stream as the summation of the corresponding local, per site vectors; that is, $$f_i = \sum_{j=1}^{k} f_{i,j}.$$

In general, the local sub-streams for a stream $f_i$ may only be observed at a subset of the k remote sites. That subset is denoted by sites($f_i$) and $k_i$=|sites($f_i$)|, hence $k_i \leq k$. A goal is to solve the problem of effectively answering user queries over this collection of global frequency distributions $f_1, \ldots, f_s$ at the coordinator site. For a continuous querying environment (as opposed to the traditional one-time query environment) the coordinator 104 needs to continuously maintain (or track) the approximate answers to user queries as the local update streams $f_{i,j}$ evolving at individual remote sites 102. More specifically, a broad class of user queries $Q=Q(f_1, \ldots, f_s)$ over the global frequency vectors is defined to include (1) inner- and tensor-product queries; (2) $L_2$-Norm queries; (3) range queries, point queries, and heavy hitters; and (4) histogram and wavelet representations.

The first class of queries is inner- and tensor-product queries (i.e., join and multi-join aggregates). Given a pair of global frequency vectors, $f_1, f_2$, over the same data domain, [U], the inner-product query $$Q(f_1, f_2) = f_1 \cdot f_2 = \sum_{v=0}^{U-1} f_1[v] \cdot f_2[v]$$

is the result size of an (equi)join query over the corresponding streams (i.e., $|f_1 \bowtie f_2|$). More generally, tensor product queries $$Q(f_i, f_l, f_m, \ldots) = f_i f_l f_m \ldots$$

over multiple domain-compatible frequency vectors $f_i, f_l, f_m, \ldots$ capture the result size of the corresponding multi-join query $f_i \bowtie f_l \bowtie f_m \ldots$. Here, the notion of a "frequency vector" is generalized to capture a possibly multi-dimensional frequency distribution (i.e., a tensor). For instance, in the three-way join query $$f_1 \cdot f_2 \cdot f_3 = \sum_u \sum_v f_1[u] \cdot f_2[u, v] \cdot f_3[v],$$

the $f_2$ vector captures the joint distribution of the two attributes of stream $f_2$ participating in the join. Without loss of generality, such multi-dimensional frequency tensors are viewed as vectors (e.g., assuming some standard linearization of the tensor entries, such as row-major). As known to one of skill in the relational field, join and multi-join queries are basically the "workhorse" operations for correlating two or more data sets. Thus, they play a role in data analysis over multiple data collections. In one exemplary embodiment, join and multi-join result sizes (i.e., count aggregates) can be extended to other aggregate functions in a relatively straightforward manner as known to one of skill in the art.

The second class of queries is $L_2$-Norm query (a/k/a self-join size) for a (global) stream $f_i$ is defined as the square of the $L_2$ norm ($\|\cdot\|$) of the corresponding frequency vector; that is $$Q(f_i) = \|f_i\|^2 = f_i \cdot f_i = \sum_v (f_i[v])^2.$$

The self-join size represents demographic information about a data collection; for instance, its value is an indication of the degree of skew in the data.

The third class of queries is range queries, point queries, and heavy hitters. A range query with parameters [a,b] over a frequency distribution $f_i$ is the sum of the values of the distribution in the given range; that is $$R(f_i, a, b) = \sum_{v=a}^{b} f_i[v].$$

A point query is a special case of a range query when a=b. The heavy hitters are those points $v \in U_i$ satisfying $R(f_i,u,v) \geq \phi \cdot R(f_i,0,U_i-1)$. The frequency of the heavy hitters exceeds a $\phi$-fraction of the overall number of stream elements for a given $\phi<1$.

The fourth and last class of queries is histogram and wavelet representations. A histogram query, $H(f_i,B)$, or wavelet query, $W(f_i,B)$, over a frequency distribution $f_i$ asks for a B-bucket histogram representation or a B-term (Haar) wavelet representation of the $f_i$ vector, respectively. The goal is to minimize the error of the resulting approximate representation, which is typically defined as the $L_2$ norm of the difference between the $H(f_i,B)$ or $W(f_i,B)$ approximation and either the true distribution $f_i$ or the best possible B-term representation of $f_i$.

Approximate Query Answering

The distributed nature of the local streams comprising the global frequency distributions $\{f_i\}$ raises difficult algorithmic challenges for the approximate query tracking problems. Naive schemes that accurately track query answers by forcing remote sites to ship every remote stream update to the coordinator are impractical. They are impractical because they not only impose an inordinate burden on the underlying communication infrastructure (especially for high-rate data streams and large numbers of remote sites), but also because they limit the battery life of power-constrained remote devices, such as wireless sensor nodes. Exemplary embodiments provide continuous tracking of approximate query answers at the coordinator site with strong guarantees on the quality of the approximation. This allows an effective tradeoff between communication efficiency and query-approximation accuracy in a precise, quantitative manner. In other words, larger error tolerance for the approximate answers at the coordinator yields smaller communication overheads, ensuring continuous approximate tracking.

Randomized Sketching of Streams

Techniques based on small-space pseudo-random sketch summaries of data have proved to be effective tools for dealing with massive, rapid-rate data streams in a centralized setting. Such sketching techniques represent a streaming frequency vector f using a smaller sketch vector that is denoted by sk(f) that can be maintained as the updates are streaming by and incrementally rendering f. Typically, the entries of the sketch vector sk(f) are defined as random variables with some desirable properties that can provide probabilistic guarantees for the quality of the data approximation. These techniques can be extended to various randomized stream-sketching methods, such as Alon, Gibbons, Matias, and Szegedy (AGMS) and Count-Min sketches, as known by one of skill in the art.

The ith entry in an AGMS sketch sk(f) is defined as the random variable $$\sum_{v=0}^{U-1} F[v].$$

$\xi[v]$, where $\{\xi[v]:v\in[U]\}$, is a family of four-wise independent binary random variables that are uniformly distributed in $\{-1,+1\}$ with mutually independent families used across different entries of the sketch. Using appropriate pseudo-random hash functions, each such family can be efficiently constructed on-line in small (i.e., O(log U)) space. By construction, each entry of sk(f) is essentially a randomized linear projection (i.e., an inner product) of the f vector that uses the corresponding $\xi$ family and can be maintained over the input update stream. Start with each counter sk(f)[i]=0 and, for each I set sk(f)[i]=sk(f)[i]+$\xi_i$[v] (sk(f)[i]=sk(f)[i]-$\xi_i$[v])

whenever an insertion (or deletion) of v is observed in the stream.

Another property of such sketch structures is linearity. Given two "parallel" sketches, sk(f$_1$) and (f$_2$), that were built using the same $\xi$ families and the scalars $\alpha$ and $\beta$, then sk($\alpha f_1$+$\beta f_2$)=$\alpha$sk(f$_1$)+$\beta$sk(f$_2$).

The sketch of a linear combination of streams is the linear combination of their individual sketches. The following theorem summarizes some of the basic estimation properties of AGMS sketches for centralized streams, which are employed in exemplary embodiments. The notation x$\in$(y$\pm$z) is equivalent to |x-y|$\leq$|z|.

Theorem 1

Let sk(f$_1$) and sk(f$_2$) denote two parallel sketches comprising $$O\left(\frac{1}{\varepsilon^2}\right)\log\left(\frac{1}{\delta}\right)$$

counters that are built over the streams f$_1$ and f$_2$, where $\epsilon$, 1-$\delta$ denote the desired bounds on error and probabilistic confidence, respectively. Then, with a probability of at least 1-$\delta$, $\|sk(f_2)-sk(f_2)\|^2\in(1\pm\epsilon)\|f_1-f_2\|^2$ and sk(f$_1$)·sk(f$_2$)$\in$ (f$_1$·f$_2$$\pm\epsilon\|f_1\|\|f_2\|$). The processing time for maintaining each sketch is $$O\left(\frac{1}{\varepsilon^2}\log\left(\frac{1}{\delta}\right)\right)$$

per update.

Thus, the self-join of the difference of the sketch vectors gives a high probability relative error estimate, $\epsilon$, of the join of the difference of the actual streams. So, naturally, $\|sk(f_1)\|^2\epsilon$ (1$\pm\epsilon$)$\|f_1\|^2$. Similarly, the inner product of the sketch vectors gives a high probability estimate of the join of the two streams to within an additive error of $\epsilon\|f_1\|\|f_2\|$. This "inner product" operator over sketch vectors is slightly more complex, involving both averaging and median-selection operations over the sketch vector components. Formally, each sketch vector can be viewed as a two-dimensional n×m array, where $$n = O\left(\frac{1}{\varepsilon^2}\right), m = O\left(\log\frac{1}{\delta}\right)$$

and the "inner product" in the sketch-vector space for both the join and the self-join cases is defined as $$sk(f_1)\cdot sk(f_2) = \underset{j=1,\ldots,m}{median}\left\{\frac{1}{n}\sum_{i=1}^{n} sk(f_1)[i,j]\cdot sk(f_2)[i,j]\right\}.$$

To provide $\epsilon$ relative error guarantees for the binary join query f$_1$·f$_2$, Theorem 1 can be applied with an error bound of $\epsilon^1=\epsilon$ (f$_1$·f$_2$)/($\|f_1\|\|f_2\|$), giving a total sketching space requirement of $$O\left(\frac{\|f_1\|^2\|f_2\|^2}{\varepsilon^2(f_1\cdot f_2)^2}\log\left(\frac{1}{\delta}\right)\right)$$

counters.

The results of Theorem 1 can be extended in a natural manner to the case of multi-join aggregate queries as follows. Given an m-way join (i.e., tensor-product) query Q(f$_1$ ..., f$_m$)=f$_1$·f$_2$. . . f$_m$ and corresponding parallel AGMS sketch vectors, sk(f$_1$), . . . , sk(f$_m$), of size $$O\left(\frac{1}{\varepsilon^2}\log\left(\frac{1}{\delta}\right)\right)$$

that are built based on the specific join predicates in the query, then the inner product of the sketches $\Pi_{i=1}^{m}$sk(f$_i$) can be shown to be within an additive error of $\epsilon(2^{m-1}-1)^2\Pi_{i=1}^{m}\|f_i\|$ of the true multi-join result size. The sketches $\Pi_{i=1}^{m}$sk(f$_1$) are again defined using median-selection and averaging over terms of the form $\Pi_{i=1}^{m}$sk(f$_i$)[i, j].

Query Tracking Solution

Exemplary embodiments of the tracking algorithms ensure strong error guarantees for approximate answers to queries over the collection of global streams $\{f_i:i=1, \ldots, s\}$ at the coordinator 104, while minimizing the amount of communication with the remote sites 102. Additional desirable design attributes of exemplary embodiments include: (1) minimal global information exchanges, (2) a summary-based information exchange, and (3) stability.

First, minimal global information exchanges are desirable. Prior art schemes in which the coordinator 104 distributes information on the global streams to remote sites typically need to rebroadcast up-to-date global information to sites either periodically or during some "global resolution" stage to ensure correctness. Instead, exemplary embodiments are designed to avoid such expensive "global synchronization" steps.

Second, a summary-based information exchange is desirable. Rather than shipping complete update streams f$_{i,j}$ to the coordinator 104, remote sites 102 only communicate concise summary information (e.g., sketches) on their locally observed updates.

Finally, stability is desirable. Intuitively, the stability property means that, provided the behavior of the local streams at remote sites remains reasonably stable or predictable, there is no need for communication between the remote sites 102 and the coordinator 104.

Exemplary embodiments avoid global information exchanges entirely, because each individual remote site 102, j, continuously monitors only the $L_2$ norms of its local update streams $\{f_{i,j}:i=1,\ldots,s\}$. When a predetermined amount of change is observed locally, then a site 102 may send a concise state-update message to update the coordinator 104 with more recent information about its local update stream. Then, the site 102 resumes monitoring its local updates (see FIG. 1). Such state-update messages typically comprise a small sketch summary of the offending local streams(s) along with, possibly, additional summary information. These state-update messages allow the coordinator 104 to maintain a high-probability error guarantee on the quality of the approximate query answers returned to users.

Exemplary embodiments of the tracking scheme depend on two parameters, $\epsilon$ and $\theta$. The parameters captures the error of the local sketch summaries that are communicated to the coordinator 104. The parameter $\theta$ captures an upper bound on the deviation off the local stream 4 norms at each remote site 102 involved in the query, since the last communication with the coordinator 104. The overall error guarantee provided at the coordinator 104 is given by a function $g(\epsilon,\theta)$, which depends on the specific form of the query being tracked. However, the local constraints at each remote site 102 are substantially similar (i.e., simply tracking $L_2$ norm deviations for individual streams) regardless of the specific global query being tracked. As results demonstrated, the combination of small sketch summaries and local constraints on the stream $L_2$ norms at individual sites 102 is sufficient to provide high-probability error guarantees for a broad class of queries over the global streams, $\{f_i:i=1,\ldots,s\}$.

Intuitively, larger $\theta$ values allow for larger local deviations since the last communication and, thus, imply fewer communications to the coordinator 104. However, for a given error tolerance, the size of the $\epsilon$-approximate sketches sent during each communications is larger, because $g(\epsilon,\theta)$ is increasing in both parameters. Analysis is provided that allows an optimal division of the allowed query-error tolerance in simple cases. Also provided are empirical guidelines for more complex scenarios based on experimental observations.

A local sketch summary $sk(f_{i,j}(t))$ communicated to the coordinator 104 gives an $\epsilon$-approximate picture of the snapshot of the $f_{i,j}$ stream at time t. To achieve stability, a component of the exemplary embodiments are concise sketch-prediction models that may be communicated from remote sites 102 to the coordinator 104 along with the local stream summaries in an attempt to accurately capture the anticipated behavior of local streams. Each site 102 j is enabled and the coordinator 104 shares a prediction of how the stream $f_{i,j}$ will evolve over time. The coordinator 104 employs this prediction to answer user queries, while the remote site 102 checks that the prediction is close to (i.e., within $\theta$ bounds) the actual observed distribution $f_{i,j}$. As long as the prediction accurately captures the local update behavior at the remote site 102, no communication is needed. Taking advantage of the linearity properties of sketch summaries, the predicted distribution is represented using a concise predicted sketch. Thus, predictions in exemplary embodiments are based on concise summary information that can be efficiently exchanged between the remote site 102 and the coordinator 104 when the model is changed.

Figure 2:
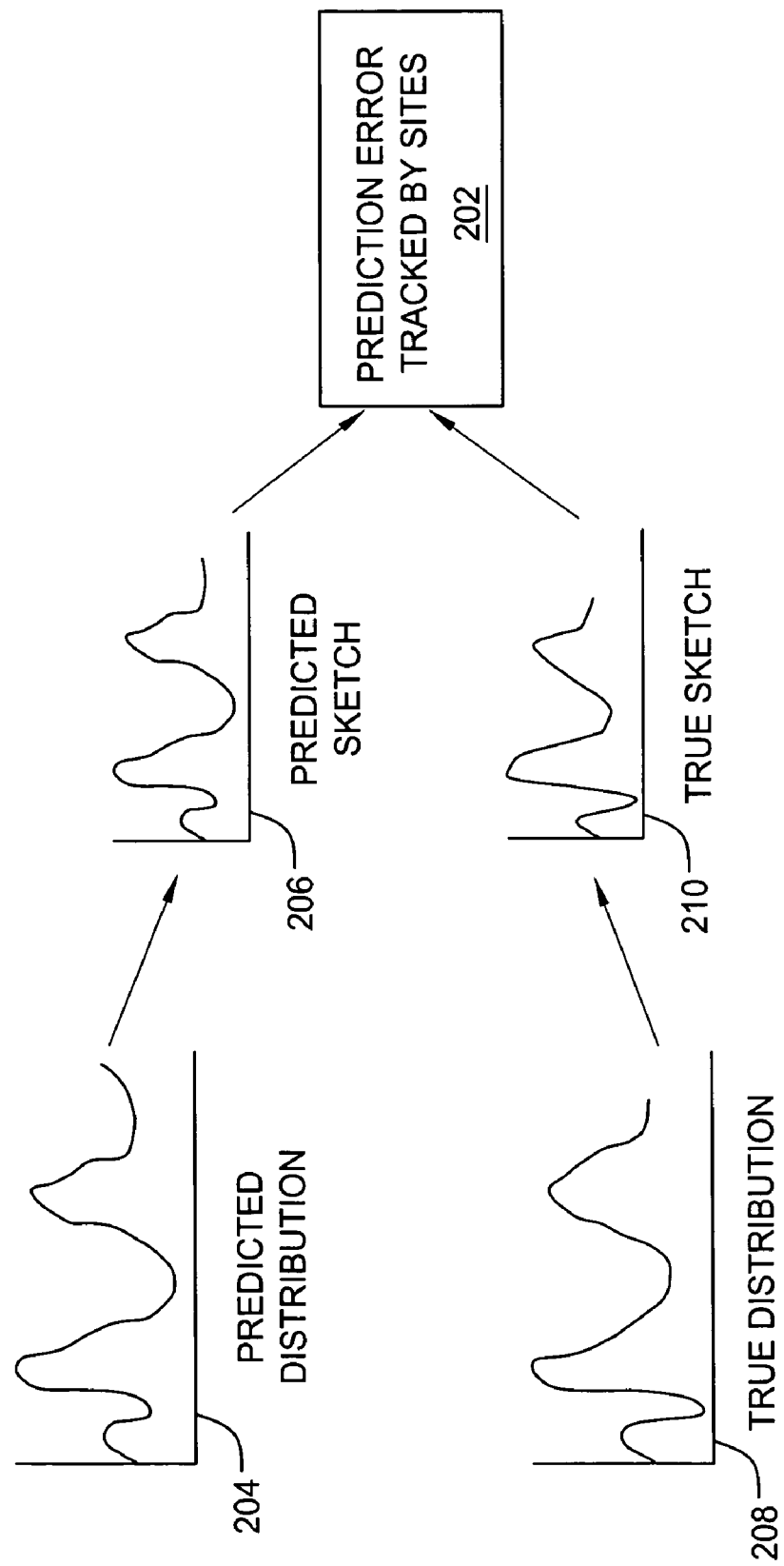
FIG. 2 shows a high-level schematic of prediction error from an exemplary embodiment of sketch-prediction-based tracking.

FIG. 2 shows a high-level schematic 200 of prediction error 202 from an exemplary embodiment of sketch-prediction-based tracking. In experiments, a predicted distribution 204 was used to generate a predicted sketch 206, which is used by the coordinator 104 for query answering. The predicted distribution 204 approximated a true distribution 208 and the predicted sketch 206 approximated a true sketch 210. The prediction error 202 was the error of the predicted sketch 206 compared to the true sketch 210. From the analysis of the protocol, it was determined that as long as local constraints are satisfied, the predicted sketches at the coordinator 104 are approximately equivalent to $g(\epsilon,\theta)$-approximate sketch summaries of the global data streams.

Exemplary embodiments of distributed query-tracking schemes and sketch-prediction models for capturing remote site 102 behavior are provided. In addition, exemplary embodiments include an effective improvement of the basic AGMS sketching technique that helps remote sites 102 to track their local constraints over massive, rapid-rate streams in a guaranteed, small time per update.

Basic Tracking Scheme

One exemplary embodiment of a tracking scheme is based on inner product and generalized tensor-product (i.e., multi-join) queries. Other exemplary embodiments for the other query classes follow as corollaries of the inner-product case. A single inner product (i.e., join) query $Q(f_1,f_2)=f_1 \cdot f_2$ over the distributed tracking architecture 100. A remote site 102 j participates in the distributed evaluation of $Q(f_1,f_2)$, i.e., j∈sites$(f_1)\cup$sites$(f_2)$. Each such site maintains AGMS sketches on its locally observed substreams $f_{1,j}$ and/or $f_{2,j}$. The term sketches implies AGMS sketches in the following sense. If each participating site 102 sends the coordinator 104 its up-to-date local stream sketches $sk(f_{1,j}(t))$ and/or $sk(f_{2,j}(t))$, then, by sketch linearity, the coordinator 104 can compute the up-to-date sketches of the global streams $sk(f_i(t))=\Sigma_j sk(f_{i,j}(t))$ (i=1,2) and provide an approximate answer to the join query at time t with the error guarantees specified in Theorem 5. In an initial coordination step, each remote site 102 obtains the size parameters for its local sketches and the corresponding hash functions (which are the same across all sites 102) from the coordinator 104.

In an exemplary embodiment of the tracking scheme, to minimize the overall communication overhead, remote sites 102 can ship a concise sketch-prediction model for their local updates to $f_i$, in addition to their local stream sketches to the coordinator 104. A sketch prediction model allows the coordinator 104 to construct a predicted sketch $sk^p(f_{i,j}(t))$ in conjunction with the communicated local stream sketch. The predicted sketch is for the up-to-date state of the local stream sketch $sk(f_{i,j}(t))$ at any future time instant t, based on the locally observed update behavior at the remote site 102. The coordinator 104 then employs these collections of predicted sketches $sk^p(f_{i,j})$ to track continuously an approximate answer to the distributed join query. There are various options for sketch prediction models. After a remote site 102 j∈sites $(f_i)$ where i∈$\{1,2\}$ ships its local sketch $sk(f_{i,j})$ and possibly a corresponding sketch prediction model to the coordinator, the site 102 j continuously monitors the $L_2$ norm of the deviation of its local up-to-date sketch $sk(f_{i,j}(t))$ from the corresponding predicted sketch $sk^p(f_{i,j}(t))$ employed for estimation at the coordinator. The site 102 checks the following condition at every time instant t:

$$\|sk(f_{i,j}(t)) - sk^p(f_{i,j}(t))\| \leq \frac{\theta}{\sqrt{k_i}} \|sk(f_{i,j}(t))\| \quad (*)$$

that is, a communication to the coordinator 104 is triggered only if the relative $L_2$ norm deviation of the local, up-to-date sketch $sk(f_{i,j}(t))$ from the corresponding predicted sketch exceeds $$\frac{\theta}{\sqrt{k_i}}$$

(where $k_i = |sites(f_i)|$).

FIG. 3 shows an exemplary embodiment of pseudo code for processing stream updates and tracking local constraints at remote sites 102 as well as providing approximate answers at the coordinator 102. The pseudo code includes procedures for sketch maintenance and tracking at a remote site j∈sites $(f_i)\{i\in 1,2\})$ and for join-size estimation at the coordinator (t denotes current time) as follows.

Procedure SiteUpdate(j, i, v,±1, ϵ,δ,θ, ki)
Input: Site index j, stream index i, inserted/deleted value v∈[U];
sketch error, confidence, and local-deviation parameters ϵ,δ, θ;
"distribution factor" $k_i$ for stream i.
1. UpdateSketch($sk(f_{i,j})$,<i,v±1>)//update current and
2. UpdatePredictedSketch($sk^p(f_{i,j}(t))$)//predicted sketches
3.

$$\text{if } \|sk(f_{i,j}) - sk^p(f_{i,j}(t))\| > \frac{\theta}{\sqrt{k_i}} \|sk(f_{i,j})\| \text{ then}$$

4. Compute sketch-prediction model predModel($f_{i,j}$)
5. Send {i, j, $sk(f_{i,j})$, predModel($f_{i,j}$)} to coordinator
Procedure EstimateJoin(id($f_1$), id(f2))
Input: Global-stream identifiers id($f_1$), id(f2).
Output: Approximate answer to join-size query $f_1 \cdot f_2$.
1. for i:=1 to 2 do
2. Set $sk^p(f_1(t))$:=0
3. for each j∈sites($f_i$) do
4. $sk^p(f_i(t))$:=$sk^p(f_i(t))$+$sk^p(f_{i,j}(t))$
5. return $sk^p(f_1(t)) \cdot sk^p(f_2(t))$ The following theorem demonstrates that, as long as the local $L_2$ norm deviation constraints are met at all participating sites 102 for the distributed $f_1 \cdot f_2$ join, then a strong error guarantee is provided at the coordinator 102 for the approximate query answer, which is based on the predicted sketches.

Theorem 2

Assume local stream sketches of size $$O\left(\frac{1}{\varepsilon^2}\right) \log\left(\frac{1}{\delta}\right)$$

and let $\hat{s}_i \Sigma_{j\in sites(f_i)} = sk^p(f_{i,j})(i\in\{1,2\})$. Also, assume that, for each remote site 102 j∈sites($f_i$)(i∈{1,2}), the condition (*) is satisfied. Then, with probability at least $1-2(k_1+k_2)\epsilon$, $$\hat{s}_1 \cdot \hat{s}_2 \epsilon f_1 \cdot f_2 \pm (\epsilon + (1+\epsilon)^2(1+\theta)^2 1)) \|f_1\| \|f_2\|.$$

Proof: Consider the inner product of the "global" predicted sketches $\hat{s}_1 \cdot \hat{s}_2$. Algebraic manipulation gives the following.

$$\hat{s}_1 \cdot \hat{s}_2 = \left(\sum_j sk^p(f_{1,j})\right) \cdot \left(\sum_j sk^p(f_{2,j})\right) =$$

$$\left(\sum_j sk^p(f_{1,j}) - sk(f_{1,j})\right) +$$

$$sk(f_{1,j}) \cdot \left(\sum_j ((sk^p(f_{2,j}) - sk^p(f_{s,j})) + sk(f_{2,j}))\right) =$$

$$\sum_j sk(f_{1,j}) \cdot \sum_j sk(f_{2,j}) +$$

$$\sum_j (sk^p(f_{1,j}) - sk(f_{1,j})) \cdot \sum_j sk(f_{2,j}) +$$

$$\sum_j (sk^p(f_{2,j}) - sk(f_{2,j})) \cdot \sum_j sk(f_{1,j}) +$$

$$\sum_j (sk^p(f_{1,j}) - sk(f_{1,j})) \cdot \sum_j (sk^p(f_{2,j}) - sk(f_{2,j}))$$

By sketch linearity, the first term in the above sum is the estimate of $f_1 \cdot f_2$, which can be bounded by Theorem 1, assuming all sketch computations produce results within their error bounds. In addition, by the Cauchy-Schwarz and triangle inequalities, it is known that, for any vectors $v_1, \ldots, v_k$, $|v_i \cdot v_j| \leq \|v_i\| \|v_j\|$ and $\|\Sigma_i v_i\| \leq \Sigma_i \|v_i\|$. Combining all the above facts:

$$\hat{s}_1 \cdot \hat{s}_2 \in (f_1 \cdot f_2) \pm \varepsilon \|f_1\| \|f_2\| \pm$$

$$\|sk(f_2)\| \sum_j \|sk^p(f_{1,j}) - sk(f_{1,j})\| \pm$$

$$\|sk(f_1)\| \sum_j \|sk^p(f_{2,j}) - sk(f_{2,j})\| \pm$$

$$\left(\sum_j \|sk^p(f_{1,j}) - sk(f_{1,j})\|\right) \times$$

$$\left(\sum_j \|sk^p(f_{2,j}) - sk(f_{2,j})\|\right).$$

Now, using the special case of Theorem 1 for the $L_2$ norm and the local site constraint(*):

$$\hat{s}_1 \cdot \hat{s}_2 \in (f_1 \cdot f_2) \pm \|f_1\| \|f_2\| \pm$$

$$(1+\varepsilon) \|f_2\| \frac{\theta}{\sqrt{k_1}} \sum_j \|sk(f_{1,j})\| \pm$$

$$(1+\varepsilon) \|f_1\| \frac{\theta}{\sqrt{k_2}} \sum_j \|sk(f_{2,j})\| \pm$$

$$\frac{\theta^2}{\sqrt{k_1 k_2}} \left(\sum_j \|sk(f_{1,j})\|\right) \left(\sum_j \|sk(f_{2,j})\|\right)$$

$$\in (f_1 \cdot f_2) \pm \|f_1\| \|f_2\| \pm$$

-continued $$(1+\varepsilon)^2 \|f_2\| \frac{\theta}{\sqrt{k_1}} \sum_j \|f_{1,j}\| \pm$$

$$(1+\varepsilon) \|f_1\| \frac{\theta}{\sqrt{k_2}} \sum_j \|f_{2,j}\| \pm$$

$$(1+\varepsilon)^2 \frac{\theta^2}{\sqrt{k_1 k_2}} \left(\sum_j \|f_{1,j}\|\right) \left(\sum_j \|f_{2,j}\|\right).$$

Assuming the components of vectors $v_1, \ldots v_k$ are non-negative, application of the Cauchy-Schwartz inequality gives:

$$\sum_{i=1}^{k} \|v_i\| \le \sqrt{k} \sqrt{\sum_{i=1}^{k} \|v_i\|^2} \le \sqrt{k} \left\|\sum_{i=1}^{k} v_i\right\|$$

Combining with the above expressions gives:

$$\hat{s}_1 \cdot \hat{s}_2 \in f_1 \cdot f_2 \pm \|f_1\| \|f_2\| \pm 2(1\pm\varepsilon)^2 \theta \|f_1\| \|f_2\| \pm (1+\varepsilon)^2 \theta^2 \|f_1\| \|f_2\| \in f_1 \cdot f_2 \pm (\varepsilon + (1+\varepsilon)^2((1+\theta)^2-1)) \|f_1\| \|f_2\|.$$

The proof relies on the outcome of $2k_1+2k_2$ sketch computations, in total. Applying a union bound, the probability that any of these fails is no more than $2(k_1+k_2)\varepsilon$, giving the required probability bound.

Thus, by Theorem 2, using local sketches of size $$O\left(\frac{1}{\varepsilon^2} \log\left(\frac{k_1+k_2}{\delta}\right)\right),$$

satisfying the local $L_2$ norm deviation constraints at each participating remote site 102 ensures that the approximate answer for the join size $f_1 \cdot f_2$ computed using only the predicted sketches at the coordinator 104 is within an absolute error of $\pm g_Q(\varepsilon,\theta) \|f_1\| \|f_2\|$ of the exact answer. These error guarantees are similar to those obtained for the simpler, centralized case (Theorem 1), with the only difference being the approximation error bound of $g_Q(\varepsilon,\theta)=\varepsilon+(1+\varepsilon)^2((1+\theta)^2-1)\approx \varepsilon+2\theta$, ignoring quadratic terms in $\varepsilon,\theta$, which are typically very small, because $\varepsilon,\theta \le 1$. The following corollary gives the adaptation of the tracking result for the special case of a self-join query $Q(f_1)=\|f_1\|^2=\Sigma_v f_1[v]^2$. The proof follows from Theorem 2 with $f_1=f_2$.

Corollary 1

Assume local stream sketches of size $$O\left(\frac{1}{\varepsilon^2} \log\left(\frac{1}{\delta}\right)\right)$$

and let $\hat{s}_1=\Sigma_{j \in sites(f_1)} sk^P(f_{1,j})$. If each remote site 102 $j \in sites(f_1)$ satisfies the condition (*), then with a probability of at least $$1-2k_1\varepsilon, \|\hat{s}_1\|^2 \in [1 \pm (\varepsilon+\varepsilon)^2((1+\theta)^2-1))] \|f_1\|^2 \approx (1 \pm (\varepsilon+2\theta)) \|f_1\|^2.$$

Extension to Multi-Joins

In one embodiment, the analysis and results for the exemplary embodiments of the distributed tracking scheme can be extended to the case of distributed multi-join (i.e., tensor product) queries. More formally, consider an m-way distributed join $Q(f_1, \ldots, f_m)=f_1 \cdot f_2 \ldots f_m$ and corresponding parallel sketches $sk(f_{i,j})$ that are built locally at participating sites $j \in \cup_{i=1}^{m} sites(f_i)$, which is based on the specific join predicates in Q. As shown in the following theorem, simply monitoring the $L_2$ norm deviations of local stream sketches is sufficient to guarantee error bounds for the predicted sketch estimates at the coordinator 104 that are similar to the corresponding bounds for the simple centralized case.

Theorem 3

Assume parallel local stream sketches of size $$O\left(\frac{1}{\varepsilon^2} \log\left(\frac{1}{\delta}\right)\right)$$

and let $\hat{s}_i=\Sigma_{j \in sites(f_i)} sk^P(f_{i,j})(i=1, \ldots, m)$. If each remote site 102 $j \in sites(f_i)$ satisfies the condition (*), then with a probability of at least $$1-2\sum_{i=1}^{m} k_i \delta,$$

the predicted sketch estimate $\Pi_{i=1}^{m} \hat{s}_i$ at the coordinator 104 lies in the range $\Pi_{i=1}^{m} f_i \pm (\varepsilon(2^{m-1}-1)^2+(1+\varepsilon)^m((1+\theta)^m-1))$.

$$\Pi_{i=1}^{m} \|f_i\| \approx \Pi_{i=1}^{m} f_i \pm (\varepsilon^{m-1}-1)^2 \_ m\theta) \Pi_{i=1}^{m} \le \|f_i\|.$$

Proof: Proceeding along similar lines as in Theorem 2 and using the generalization of Theorem 1 to multi-joins as well as an easy generalization of the Cauchy-Schwarz inequality to tensor products of more than two vectors gives:

$$\prod_{i=1}^{m} \hat{s}_i = \prod_{i=1}^{m} ((sk^P(f_{i,j})-sk(f_{i,j}))+sk(f_{i,j}))$$

$$\in \prod_{i=1}^{m} f_i \pm \varepsilon(2^{m-1}-1)^2 \prod_{i=1}^{m} \|f_i\| \pm$$

$$m\theta(1+\varepsilon)^m \prod_{i=1}^{m} \|f_i\| \pm$$

$$\binom{m}{2} \theta^2 (1+\varepsilon)^m \prod_{i=1}^{m} \|f_i\|$$

$$\ldots \pm$$

$$\theta^m (1+\varepsilon)^m \prod_{i=1}^{m} \|f_i\|$$

$$\in \prod_{i=1}^{m} f_i \pm \varepsilon(2^{m-1}-1)^2 \prod_{i=1}^{m} \|f_i\| \pm$$

$$(1+\varepsilon)^m ((1+\theta)^m-1) \prod_{i=1}^{m} \|f_i\|.$$

The result follows easily from the above expression and a simple application of the union bound.

Sketch-Prediction Models

Exemplary embodiments provide different options for the sketch prediction models employed to describe local update behaviors at remote sites 102. Such models are part of the information exchanged between the remote sites 102 and the coordinator 104 so that both parties are "in sync" with respect to predicted query results and local constraint monitoring. If the prediction models result in predicted sketches, $sk^P(f_{i,j})$, that are sufficiently close to the true state of the local sketches at site 102 j, then no communication is required between site 102 j and the coordinator 104. Thus, exemplary embodiments keep sketch prediction models concise and yet powerful enough to effectively capture stability properties in the distributed tracking environment. In each case, the prediction models consider how the local distribution, $f_{i,j}$, changes as a function of time between the time of the last communication to the coordinator 102, $t_{prev}$, and the current time, t. Then, it is shown how to translate this model to a model for predicting the change in the sketch of $f_{i,j}$ over time (FIG. 2). Again, assume a consistent notion of "global time" in the system and that the differences between local "clocks" at sites 102 are sufficiently small to be ignored. The linearity properties of sketches play a role in the design of space- and time- and communication efficient sketch prediction models, in exemplary embodiments.

Static Model

One exemplary embodiment is the simplest prediction model, the static model, which essentially assumes that the local stream distribution, $f_{i,j}$, remains static over time. In other words, the prediction for the distribution, $f_{i,j}$, at the current time instant t (denoted by $f_{i,j}^P(t)$) does not change over the time interval $t-t_{prev}$ or $f_{i,j}^P(t)=f_{i,j}(t_{prev})$. This implies that the predicted sketch, $sk^P(f_{i,j}(t))$, employed at both the coordinator 104 and the remote site 102 j is exactly the sketch last shipped from site j; that is:

$$sk^P(f_{i,j}(t))=sk^P(f_{i,j}^P(t))=sk(f_{i,j}(t_{prev})).$$

Such a prediction model is trivial to implement, requiring little additional information to be exchanged between the coordinator 104 and the remote sites 102 other than the sites 102 local sketches that are sent when determined by condition (*).

Linear Growth Model

One exemplary embodiment is the linear growth model. Due to its simplistic nature, the static model can only achieve stability in the unrealistic scenario when all frequency counts in the $f_{i,j}$ remain reasonably stable. This is clearly not the case, for instance, when local frequency counts are growing as more updates arrive at remote sites. In such cases, a reasonable strawman model is to assume that the future of the local distribution will resemble a scaled-up version of its past. That is, assume that $f_{i,j}(t)$ has the same shape as $f_{i,j}(t_{prev})$ with proportionately more elements. The linear growth model is based on this assumption, setting $$f_{i,j}^P(t) = \frac{t}{t_{prev}} f_{i,j}(t_{prev}),$$

i.e., using a linear scaling of $f_{i,j}(t_{prev})$ to predict the current state of the distribution. Scaling by time makes sense, for example, in a synchronous updates environment, where updates from remote sites 102 arrive regularly at each time interval. By sketch linearity, this implies that the corresponding predicted sketch is:

$$sk(f_{i,j}(t)) = sk(f_{i,j}^P(t)) = \frac{t}{t_{prev}} sk(f_{i,j}(t_{prev})),$$

which is a linear scaling of the most recent local sketch of $f_{i,j}$ sent to the coordinator 104 and no additional information need be exchanged between sites 102 and the coordinator 104 in this exemplary embodiment.

Velocity Acceleration Model

Another exemplary embodiment is the velocity acceleration model. Although intuitive, the linear growth model suffers from at least two shortcomings. First, it predicts the future behavior of the stream as a linear scaling of the entire history of the distribution, whereas, in many real life scenarios, only the recent history of the stream may be relevant for such predictions. Second, it imposes a linear, uniform rate of change over the entire frequency distribution vector and, thus, cannot capture or adapt to shifts and differing rates in the distribution of updates over the vector. The velocity/acceleration model addresses these shortcomings by explicitly attempting to build a richer prediction model that uses more parameters to better-fit changing data distributions. More specifically, letting $\Delta=t-t_{prev}$, the velocity/acceleration model predicts the current state of the $f_{i,j}$ distribution as $$f_{i,j}^P(t)=f_{i,j}(t_{prev})+\Delta v_{i,j}+\Delta^2 a_{i,j},$$

where the vectors $v_{i,j}$ and $a_{i,j}$ denote a velocity and an acceleration component, respectively, for the evolution of the $f_{i,j}$ stream. Again, by sketch linearity, this implies the predicted sketch is:

$$sk^P(f_{i,j}(t))=sk(f_{i,j}(t_{prev}))+\Delta\Delta sk(v_{i,j})+\Delta^2 sk(a_{i,j}).$$

Thus, to build a predicted sketch at the coordinator 104 under a velocity/acceleration model, a velocity sketch, $sk(v_{i,j})$, and an acceleration sketch, $sk(a_{i,j})$ are needed. One exemplary embodiment includes a method for computing these two sketches at site 102 j. A sketch is maintained on a window of the W most recent updates to $f_{i,j}$. This sketch is scaled by the time difference between the newest and the oldest updates stored in the window to give an appropriate velocity sketch to be shipped to the coordinator. The acceleration sketch is estimated as the difference between the recent and previous velocity sketches scaled by the time difference. When remote site 102 j detects a violation of its local $L_2$ norm constraint for $f_{i,j}$ at time t, it computes a new velocity sketch, $sk(v_{i,j})$, based on the window of the W most recent updates to $f_{i,j}$ and estimates a new acceleration sketch, $sk(a_{i,j})$, as the difference between $sk(v_{i,j})$ and the corresponding velocity sketch at time $t_{prev}$ scaled by $$\frac{1}{t-t_{prev}}.$$

The only additional model information that needs to be communicated to the coordinator from site 102 j is the new velocity sketch, $sk(v_{i,j})$, because the coordinator already has a copy of the previous velocity sketch and can independently compute the acceleration sketch.

Thus, while the richer velocity/acceleration model can give a better fit for dynamic distributions, it also effectively doubles the amount of information exchanged compared to the simpler prediction models. Furthermore, the effectiveness of the velocity/acceleration predictions can depend on the size of the update window, W. It is possible to set W adaptively for different stream distributions in other exemplary embodiments. In one exemplary embodiment, different settings are evaluated for W experimentally over real-life data.

FIG. 5 is a table summarizing information for exemplary embodiments of the three prediction schemes: the static model, the linear growth model, and the velocity/acceleration model. The information includes the model information exchanged between the sites 102 (column 2) and the coordinator 104 and the corresponding predicted sketches (column 3).

Analysis

The worst-case communication cost is analyzed for an exemplary embodiment of the inner product tracking scheme as a function of the overall approximation error at the coordinator 104 under some simplifying assumptions.

Theorem 4

Assume the static prediction model for an inner-product query $Q(f_1 \cdot f_2) = f_1 \cdot f_2$ with $\epsilon, \delta, \theta$, and $k_i$ as previously defined and let $\psi = g_Q(\epsilon, \theta) \approx \epsilon + 2\theta$ denote the error tolerance at the coordinator 104. Then, for appropriate settings of parameters $\epsilon$ and $\theta$ (specifically, $$\varepsilon = \frac{2\psi}{3}, \theta = \frac{\psi}{6}\Bigg),$$

the worst case communication cost for a remote site 102 j processing $N_j$ local updates to a stream $f_{i,j}$ is $$O\left(\frac{\sqrt{k_i}}{\psi^3} \log\left(\frac{k_i}{\delta}\right) \log N_j\right).$$

Proof: First, assume that all updates are insertions, i.e., of the form $<i,v,+1>$. In the static model, the worst-case effect of each such update is to increase the difference between the predicted (static) distribution and the true distribution by at most one. Let $N_{new}$ denote the number of updates received at the last communication. Then, in the worst case, the difference between predicted and true distribution is $N_{new}$ and a communication is triggered when $$N_{new} > \frac{\theta}{\sqrt{k}}(N_{old} + N_{new}).$$

This gives the total number of communications after N updates as $$O\left(\frac{\sqrt{k}}{\theta} \ln N\right).$$

The cost of each communication is $$O\left(\frac{1}{\varepsilon^2} \log\frac{1}{\delta}\right),$$

proportional to the size of a sketch. Therefore, the overall cost depends on $$O\left(\frac{\sqrt{k}}{\varepsilon^2 \theta}\right).$$

To give an error guarantee of $\psi \|f_1\| \|f_2\|$, set $\psi = g_Q(\epsilon, \theta) = \epsilon + (1+\epsilon)^2((1+\theta)^2 - 1) \approx \epsilon + 2\theta$, assuming that terms quadratic in $\epsilon$ and $\theta$ are small enough to be neglected. So, maximize $$\varepsilon^2 \frac{1}{2}(\psi - \varepsilon).$$

Differentiating with respect to $\epsilon$ and setting equal to zero gives $2\epsilon\psi - 3\epsilon^2 = 0$, giving $$\varepsilon = \frac{2}{3}\psi \text{ and } \theta = \frac{1}{6}\psi.$$

Thus, assuming that the "distribution factors" $k_i$ of streams in the join query are reasonably small, the worst cast communication cost even for the simplest prediction model is comparable to that of the one-shot sketch-based approximate query computation with the same error bounds (Theorem 1). Each counter in the sketches for site 102 j is of size $O(\log N_j)$ bits. This analysis extends in a natural manner to the case of multi-join aggregates, as known to one of skill in the art. Providing similar analytical results for the more complex linear growth and velocity/acceleration models is more complex. Instead, different strategies were experimentally evaluated for setting $\epsilon$ and $\theta$ for minimizing worst-case communication over real-life streams. (See FIGS. 10A and 10B.)

Time-Efficient Tracking: The Fast-AGMS Sketch

A drawback of AGMS randomized sketches is that every streaming update must "touch" every component of the sketch vector to update the corresponding randomized linear projection. This requirement, however, poses significant practical problems when dealing with massive, rapid-rate data streams. Because sketch summary sizes can vary from tens to hundreds of kilobytes (especially when tight error guarantees are required, e.g., for join or multi-join aggregates), touching every counter in such sketches is infeasible when dealing with large data rates (e.g., monitoring a high-capacity network link). This problem is further compounded in the distributed tracking scenario, where, for each streaming update, a remote site 102 needs to track the difference between a sketch of the updates and an evolving predicted sketch.

Exemplary embodiments of a fast-AGMS sketch structure solve this problem by guaranteeing logarithmic time (i.e., $O(\log(1/\delta))$) sketch update and tracking costs, while offering a slightly improved space/accuracy tradeoff over basic AGMS sketches.

A fast-AGMS sketch for a stream f over [U] (also denoted by sk(f)) comprises b×d counters (i.e., linear projections) arranged in d hash tables, each with b hash buckets. Each hash table $I=1, \ldots, d$ is associated with (1) a pairwise-independent hash function $h_l()$ that maps incoming stream elements uniformly over the b hash buckets (i.e., $h_l:[U] \to [b]$); and (2) a family $\{\xi_l[v]:v \in [U]\}$ of four-wise independent $\{-1,+1\}$ random variables. To update sk(f) in response to an addition of u to element v, the $h_l()$ has functions are used to determine the appropriate buckets in the sketch, setting $$sk(f)[h_l(v),l] = sk(f)[h_l(v),l] + u\xi_l(v)$$

for each l=1, . . . , d. The time per update is only O(d), because each update touches only one bucket per hash table. The structure of an exemplary fast-AGMS sketch 400 is illustrated in FIG. 4.

Given two parallel fast-AGMS sketches $sk(f_1)$ and $sk(f_2)$, using the same hash functions and $\xi$ families, the inner product $f_1 \cdot f_2$ is estimated by the sketch "inner product":

$$sk(f_1) \cdot sk(f_2) = \underset{l=1,\ldots,d}{\text{median}}\left\{\sum_{i=1}^{b} sk(f_1)[i, l] \cdot sk(f_2)[i, l]\right\}.$$

In other words, rather than averaging over independent linear projections built over the entire [U] domain, this exemplary embodiment of the fast-AGMS sketch averages over partitions of [U] generated randomly through the $h_i()$ hash functions. As the following theorem shows, this results in space/accuracy tradeoffs similar to that in the prior art, while requiring only $$O(d) = O\left(\log\left(\frac{1}{\delta}\right)\right)$$

processing time per update, because an element only touches a single partition (i.e., bucket) per has table.

Theorem 5

Let $sk(f_1)$ and $sk(f_2)$ denote two parallel fast-AGMS sketches of streams $f_1$ and $f_2$ with parameters $$b = \frac{8}{\varepsilon^2} \text{ and } d = 4\log\left(\frac{1}{\delta}\right),$$

where $\varepsilon, 1-\delta$ denote the desired bounds on error and probabilistic confidence, respectively. Then, with a probability of at least $1-\delta \|sk(f_1) - sk(f_2)\|^2 \varepsilon (1 \pm \varepsilon) \|f_1 - f_2\|^2$ and $sk(f_1) \cdot sk(f_2) \varepsilon$ $(f_1 \cdot f_2 \pm \varepsilon \|f_1\| \|f_2\|)$. The processing time required to maintain each sketch is $$O\left(\log\left(\frac{1}{\delta}\right)\right)$$

per update.

Proof (sketch): Consider the estimate X, given from computing the inner product of the lth row of $sk(f_1)$ with the corresponding row of $sk(f_2)$. It can be shown that $$E(X) = f_1 \cdot f_2 \text{ and } \text{Var}(X_l) \le \frac{1}{b}\|f_1\|^2 \|f_2\|^2,$$

provided that $g_i$ is drawn from a family of four-wise independent hash functions and $f_i$ is drawn from a family of two-wise independent hash functions. Applying the Chebyshev inequality, $$Pr\left[|X_l - f_1 \cdot f_2| > \sqrt{\frac{8}{b}} \|f_1\|\|f_2\|\right] < \frac{1}{8}.$$

Taking the median of d such estimators gives an estimate whose probability of being outside this range of $2^{d/4}$, using standard Chernoff-bound arguments. Thus, $$Pr\left[|sk(f_1) \cdot sk(f_2) - f_1 \cdot f_2| > \sqrt{\frac{8}{b}} \|f_1\|\|f_2\|\right] < 2^{-\frac{d}{4}}.$$

Substituting the values for the b and d parameters gives the required bounds.

The update cost of this exemplary embodiment of the fast-AGMS sketch remains $$O\left(\log\left(\frac{1}{\delta}\right)\right)$$

even when tight, relative-error guarantees are required for join or multi-join aggregates. In other words, tighter error tolerances only increase the size b of each hash table, but not the number of hash tables d, which depends only on the required confidence. Providing tight error guarantees for such complex aggregates can easily imply fairly large sketch summaries. Finally, for given $\varepsilon$ and $\delta$, this exemplary embodiment of the fast-AGMS sketch requires less space than prior art sketches, because the prior art sketches required a total of $$O\left(\frac{1}{\varepsilon^2}\log\left(\frac{1}{\delta}\right)\right)$$

hash functions (one for each $\xi$ family), whereas this exemplary embodiment of the fast-AGMS sketch only needs a pair of hash functions per hash table for a total of only $$O\left(\log\left(\frac{1}{\delta}\right)\right)$$

hash functions. This difference in space requirements becomes much more pronounced as the $\varepsilon$ approximation-error bounds become tighter.

Time-Efficient Sketch Tracking

In exemplary embodiments, each update to the local $f_{i,j}$ at site 102 j requires checking the local sketch-tracking condition on the $L_2$ norm of the divergence of the site's 102 true sketch from the corresponding predicted sketch. Implementing such a sketch-tracking scheme directly over local sketches of size $$O\left(\frac{1}{\varepsilon^2}\log\left(\frac{1}{\delta}\right)\right)$$

would imply a time complexity of $$O\left(\frac{1}{\varepsilon^2}\log\left(\frac{1}{\delta}\right)\right)$$

per update to recompute the required norms. This complexity can easily become prohibitive when dealing with rapid-rate update streams and tight error-bound requirements. Fortunately, as the following theorem demonstrates, the sketch-tracking overhead can be reduced to $$O\left(\log\left(\frac{1}{\delta}\right)\right)$$

per update by computing the tracking condition in an incremental fashion over the input stream. Exemplary embodiments of the tracking algorithm uses the fast-AGMS sketch structure as well as concise $$O\left(\log\left(\frac{1}{\delta}\right)\right)$$

-size pre-computed data structures to enable incremental sketch tracking. One exemplary embodiment uses the general velocity/acceleration model. Both the static and linear-growth models can be thought of as instances of the velocity/acceleration model with certain parameters fixed.

Theorem 6

Assuming fast-AGMS sketches of size $$O\left(\frac{1}{\varepsilon^2}\log\left(\frac{1}{\delta}\right)\right),$$

the computation of the sketch tracking condition (*) at site 102 j can be implemented in $$O\left(\log\left(\frac{1}{\delta}\right)\right)$$

time per update, where the predicted sketch $sk^P(f_{i,j}(t))$ is computed in the velocity/acceleration model.

Proof: A goal is to track $\|sk^P(f_{i,j}(t))-sk(f_{i,j}(t))\|$. Set $\Delta=t-t'$ and write this quantity out by substituting in the parameters of the acceleration model:

$$\left\|sk(f_{i,j}(t'))+\Delta sk(v_{i,j})+\frac{1}{2}\Delta^2 sk(a_{i,j})-sk(f_{i,j})\right\|.$$

The estimate of the norm using sketches is produced by computing an estimate from each row of the array of counts, then taking the median of these estimates. The estimate from the lth single row is computed. For this row, write $V_l$ for the vector representing the corresponding row from the velocity sketch; $A_l$ for the vector representing the corresponding row from the acceleration sketch scaled by ½ and $S_l$ for the difference of rows coming from $sk(f_{i,j}(t'))-sk(f_{i,j})$. The estimate, est, can then be written as:

$$est^2 = \sum_k (S_l[k]) + \Delta V_l[k] + A_l[k]^2$$
$$= \sum_k (S_l[k]^2 + 2\Delta S_l[k]V_l[k] + 2\Delta^2(A_l[k]S_l[k] + V_l[k]^2) +$$
$$\Delta^3 2V_l[k]A_l[k] + \Delta^4 A_l[k]^2)$$
$$= \sum_k S_l[k]^2 + 2\Delta\sum_k S_l[k]V_l[k] + 2\Delta^2\sum_k A_l[k]S_l[k] +$$
$$\Delta^2 \sum_k (V_l[k]+\Delta A_l[k])^2$$

The last term is easy to track, because $V_l$ and $A_l$ do not change until the sketch tracking condition is violated. The following quantities can be computed when the sketches are set.

$$vv_l = \sum_k V_l[k]^2; \quad aa_l = \sum_k A_l[k]^2; \quad va_l = \sum_k A_l[k]V_l[k]$$

At each time step, the following term is computed in constant time.

$$\Delta^2 \sum_k (V_l[k]+\Delta A_l[k])^2 = \Delta^2(aa_l + 2\Delta va_l + \Delta^2 vv_l)$$

The other three terms are affected by updates, but properties of the fast-AGMS sketches can be used to maintain them efficiently based on their previous values. Define $$ss_l = \sum_k S_l[k]^2; \quad sv_l = \sum_k S_l[k]V_l[k]; \quad sa_l = \sum_k A_l[k]S_l[k].$$

The structure of the fast-AGMS sketches means that following an update, $u\in\{+1,-1\}$ to $f_{i,j}[v]$, only one entry in $S_i$ is affected:

$$S_l[h_l(v)] \leftarrow S_l[h_l(v)] - \xi_l(v)*u.$$

So, ss, sv, and sa can all be efficiently maintained in constant time per update:

$$ss_l \leftarrow ss_l + (S_l[h_l(v)] - \xi_l(v)*u)^2 - S_l[h_l(v)]^2 = ss_l + u^2 - 2u*\xi_l(v)*S_l[h_l(v)] sv_l \leftarrow sv_l - \xi_l(v)*u*V_l[h_l(v)] sa_l \leftarrow sa_l - \xi_l(v)*u*A_l[h_l(v)] \text{ and } S_l[h_l(v)] \rightarrow S_l[h_l(v)] - \xi_l(v)*u.$$

Putting all these together, the estimate can be rewritten as $$est_l^2 = ss_l + 2\Delta sv_l + 2\Delta^2 sa_l + \Delta^2(aa_l + 2\Delta va_l + \Delta^2 vv_l).$$

This allows computation of the estimate produced by each row in constant time for every update. The estimate for $\|sk^P(f_{i,j})-sk(f_{i,j})\|$ is found by computing the median of all d estimates in time $O(d)$. The total time cost is $O(d)$ per update.

FIG. 6 shows pseudo code for an exemplary embodiment of a fast procedure for tracking updates at remote sites 102 as follows.

Procedure Site Update (j, u, i)
Input: site index j : update u to position i

1. Update ss, sv, sa from u, i, f, g, S☐
2. Δ=t−t'
3. for l=1 to d do
4. $est_l^2 = ss_l + 2\Delta sv_l + 2\Delta^2 sa_l + \Delta^2(aa_l + 2\Delta va_l + \Delta^2 vv_l)$;
5. update $skx^2$
6. if (median, $est_1^2 > \theta^2$ lk median$_l$ $skx_l^2$) then
7. compute new $sk_j^v, sk_j^a$;
8. send new model to coordinator;
9. recomputed aa, va, vv;
10. t'=t;

If this exemplary embodiment of the fast tracking scheme detects that a θ bound has been violated, the parameters of the sketch-prediction model are recomputed and sketch information is sent to the coordinator 104. Such communications necessarily require $$O\left(\frac{1}{\varepsilon^2}\log\left(\frac{1}{\delta}\right)\right)$$

time, but occur relatively rarely.

The computed quantity $est^2$ is compared to $$\frac{\theta}{\sqrt{k_i}}\|sk(f_{i,j})\|.$$

This can be tracked using the same method that ss is tracked with in the above proof. Because S, A, and V are stored in $sk(f_{i,j})$, $sk(v_{i,j})$, and $sk(a_{i,j})$, this tracking method requires only constant extra space over the naive scheme that computes the difference every update. To initialize this method, compute initial values of vv, va, and aa, when a new velocity and acceleration sketch is chosen. At this time, t=t', and so $sk(f_{i,j}(t))=sk(f_{i,j}(t'))$. Hence, initialize ss=sa=sv=0 and proceed to increase these quantities as updates are received.

Handling Other Query Classes

The result applies to other query classes also. The basic intuition is that such queries can be viewed as special inner products of the distribution (e.g. with wavelet basis vectors) for which sketches can provide guaranteed-quality estimates. The predicted sketch of fi at the coordinator can be treated as a $g(\epsilon,\theta)$-approximate sketch of $f_i$, which accounts for both sketching error ($\epsilon$) and remote-site deviations (θ).

Range Queries, Point Queries, and Heavy Hitters

A given range query $R(f_i,a,b)$ can be reposed as an inner product with a vector $e_{[a,b]}$ where $e_{[a,b]}[v]=1$ if $a \leq v \leq b$ and 0 otherwise. This implies the following theorem.

Theorem 7

Assume local-stream sketches of size $$O\left(\frac{1}{\varepsilon^2}\log\left(\frac{1}{\delta}\right)\right)$$

and let $\hat{s}_i \Sigma_{j \in sites(f_i)} sk^p(f_{i,j})$. If for each remote site $j \in sites(f_i)$ satisfies the condition (*), then with probability at least $1k_i\delta$, $\hat{s}_i \cdot sk(e_{[a,b]}) \in R(f_i,a,b) \pm (\epsilon+(1+\epsilon)^2)((1+\theta)^2-1)(b-a+1)\|f_i\| 1-2k_1\delta, \|\hat{s}_1\|^2 \epsilon [1 \pm (\epsilon+(\epsilon+(1+\epsilon)^2((1+\theta)^2-1))]$
$\|f_1\|^2 \approx (1 \pm (\epsilon+2\theta))\|f_1\|^2$.

An immediate corollary is that point queries can be answered with $\approx(\epsilon+2\theta)\|f_i\|$ error. Heavy-hitter queries can be answered by asking all $U_i$ point queries, and returning those v whose estimate exceeds $\phi R(f,a,b)$ (with guarantees similar to the centralized, one-shot case).

Histogram and Wavelet Representations

It is known how to use $\epsilon$-approximate sketches to find B-term Haar-wavelet transforms that carry at least 1−$\epsilon$ of the energy of best B-term representation if this representation has large coefficients. In one setting, the sketch at the coordinator is essentially a $g(\epsilon,\theta)$-approximate sketch; thus, our analysis in conjunction with Theorem 3 implies that exemplary embodiments of the schemes can track a 1−$g(\epsilon,\theta)$ approximation to the best B-term wavelet representation at the coordinator. Similarly, it is known how to use $\epsilon$-approximate sketches to find at approximate histogram representation with error at most 1+B$\epsilon$ times the error of the best B-bucket multidimensional histogram. Combining the use results with Theorem 3 producers a schema for tracking a 1+B$g(\epsilon,\theta)$ approximation to the best B-bucket multidimensional histogram.

Extensions

So far, exemplary embodiments have considered the case where queries are to be answered on the whole history of updates. In many applications, only recent updates are relevant to queries, and older information should be dropped or weighted so that its contribution is minimal. Two standard approaches to keeping results fresh are included in a tracking scenario embodiments. One embodiment extends techniques to more complex, multi-level distributed monitoring hierarchies, including analysis of the optimal approximation parameter settings under different communication-cost objectives. Other embodiments consider alternate sketch prediction models.

Sliding Windows and Exponential Decay

In the sliding window case, the current distribution $f_i$ is limited to only those updates occurring within the last $t_w$ time units, for some fixed value of $t_w$. The tracking condition is modified so that the remote sites build a sketch of the most recent $t_w$ time units, and track whether a predicted sketch for this interval is within θ error of the interval norm. The role of the coordinator remains the same: to answer a query; it uses the predicted sketch. In the case that the site is not space-constrained, the remote site can buffer the updates that occurred in the window. When the oldest update v in the buffer is more than $t_w$ time units old, it can be treated as an update <i,v,−1> to $f_i$. The effect of the original update of v is subtracted from the sketch, and so the sketch only summarizes those updates within the window of $t_w$. Using the efficient tracking method, the asymptotic cost is not altered in the amortized sense, because each update is added and later subtracted once, giving an amortized cost of $$O\left(\log\left(\frac{1}{\delta}\right)\right)$$

per update.

In the case that the remote site does not have space to buffer all updates in the sliding-window, techniques such as the exponential histogram approach can be applied to bound the amount of space required. This method allows the sketch of the window to be approximated by the combination of a logarithmic number of sketches of non-overlapping sub-windows. However this does not directly lead to guaranteed bounds: although the sketch of the sliding-window is well approximated by this method, when the predicted sketch is subtracted, the bounds to do not hold. In practice, this approach or a similar method of dividing the window into non-overlapping windows and approximating the window with these pieces is likely to give sufficiently good results. An alternate sliding-window approach is to consider only the most recent SW. updates. This has two variants: (1) when this policy is applied locally to the site and (2) when the policy is to be applied globally all over all updates. In the first case, the above discussion applies again, and the same results follow. For the second case, the problem seems more involved, and can provide an interesting direction for future research.

The exponential decay model is a popular alternative to the sliding-window model. Briefly, the current distribution $f_i(t)$ is computed as $f_i(t) = \lambda^{t-t'} f_i(t')$ for a positive decay constant $\lambda < 1$—for example, $\lambda = 0.95$ or $0.99$. Updates are processed as before, so an update v means $f_i(t)[v] \rightarrow f_i(t)[v]+1$. As in the sliding window case, the action at the coordinator is unchanged: given a suitable model of how the (exponentially decayed) distribution changes, the coordinator uses the predicted sketch to answer queries. At the remote site, the tracking condition is again checked. Because the decay operation is a linear transform of the input, the sketch of the decayed distribution can be computed by decaying the sketch: $sk(f_i(t)) = \lambda^{t-t'} sk(f_i(t'))$ (where t' denotes the time of the last update. Applying this directly would mean the tracking operation takes time $$O\left(\frac{1}{\varepsilon}\log\left(\frac{1}{\delta}\right)\right),$$

out by devoting some extra space to the problem, we can track the condition in time $$O\left(\log\left(\frac{1}{\delta}\right)\right)$$

again.

In one embodiment, the method includes, for each entry of the array of counts in $sk(f_{1,j})$, a tag is kept denoting the time t when it was last updated. To apply the decay to the sketch for a time t–t', take the estimate at time t' and multiply it by $\lambda^{t-t'}$. To process an update u to location i at time t, in each row, identify the entry in S that is affected ($S_l[h_l(v)]$) and to look up the last time this entry was probed as t". Then, updating the estimate by setting $$est_l^2 \rightarrow est_l^2 + u^2 + 2\lambda^{t-t''} * u * \xi(v) S[h_l(v)]$$

(This expression comes from computing the change due to decaying the entry of S by $\lambda^{t-t''}$, and subtracting the contribution of this and then adding on the contribution from the addition of u.) Update $$S_l[h_l(v)] \leftarrow \lambda^{t-t''} S_l[h_l(v)] + u * \xi_l(v),$$

and set the time of last modification to t. Theorem 8 is derived from this.

Theorem 8

The sketch tracking condition (*) can be tracked in time $$O\left(\log\left(\frac{1}{\delta}\right)\right)$$

per update in both the sliding window and the exponential decay streaming models.

Approximate Hierarchical Query Tracking

Consider a more complex distributed-tracking scenario where the communication network is arranged as a tree-structured hierarchy of nodes (i.e., sites). One goal is for the root node to track an approximate query answer effectively over the update streams observed at the leaf nodes of the hierarchy. (To simply the discussion, assume that internal nodes in the hierarchy do not observe any updates; however, such generalizations can be incorporated into the model by adding dummy leaf-child nodes to the internal nodes to accept their corresponding streams.) This hierarchical-monitoring architecture generalizes the flat, single-level model discussed earlier (essentially, an one-level hierarchy with remote sites as leaves). Such monitoring hierarchies arise naturally, for instance, in the context of sensor networks, where sensor nodes are typically organized in a routing tree with a root base-station monitoring the sensornet operation. In such scenarios, naively propagating sketch updates from the leaves to the root node is wasteful; distribution changes at leaf nodes of a subtree may effectively "cancel out" at a higher node in the hierarchy rendering further communication with nodes higher in the hierarchy unnecessary. For such multi-level hierarchies, the tracking scheme is able to exploit stability properties at any node of the hierarchy.

Other embodiments can effectively solve and analyze approximate query-tracking problems in the case of such general hierarchies. For simplicity, concentrate on the case of a self-join query $Q(f) = \|f\|^2$ (corollary 1), where the update stream f is observed across all leaf nodes in the hierarchy. The extensions to handle more general queries and site subsets are straightforward.

Assume that the tracking hierarchy comprises h+1 levels, with the root node at level 0 and the leaf nodes at level h. Compute an approximate sketch over the union of streams observed at the leaf nodes by running the sketch-tracking scheme between each internal node and its children. That is, each internal node u tracks an (approximate) AGMS sketch over its children, and then passes up relevant information to its parent when its locally-observed sketch (which summarizes the data distribution of all streams in its subtree) violates a specified deviation bound with respect to its corresponding prediction at u's parent (i.e., condition (*) with $k_j$ equal to the number of sibling of u).

Just as in the flat, single-level case, it suffices to allocate the same deviation tolerance θ to every remote site. Arguably, it suffices to allocate the same the same $\theta_l$ parameter to every node at level l in the hierarchy—essentially, this implies that each level-(l-1) node gives all its children the maximum possible error tolerance (based on its own error bounds) in order to minimize communication cost across levels l-1 and l. Now, consider a node u at level l in the tree hierarchy and let $S_u$ denote the union of update streams in the subtree rooted at u, and define (1) $\alpha_l$ as the accuracy at which u tracks its local sketch summary (for the $S_u$ stream); and (2) $\theta_l$ as the bound on the deviation of locally-maintained sketches (with respect to their predictions) at node u. The following corollary then follows easily from corollary 1.

Corollary 2

Let $\alpha$, and $\theta_l$ be as defined above. Then, the compounded error of the local AGMS sketch summaries for nodes at level l-1 of the hierarchy is $\alpha_{l-1} = \alpha_l + 2\theta$.

Corollary 2 essentially allows cascading of the basic, single-level tracking scheme to the case of multi-level hierarchies. Specifically, assuming a fixed AGMS sketching error $\epsilon$ at the leaf nodes of the hierarchy, then, by Corollary 2, summing across all levels, the total sketch-tracking error at the root node is $$\alpha_0 = \varepsilon + 2\sum_{l=1}^{h} \theta_l.$$

Assuming that the sketching error $\epsilon$ at leaf nodes is fixed (e.g., based on site memory limitations) optimize the settings for the $\theta_l$ parameters for minimizing communication costs. Consider the worst-case bounds for the static-prediction model, and two possible optimization objectives: (1) the maximum transmission cost for any node in the hierarchy (or, equivalently, the maximum load on any communication link), and (2) the aggregate communication cost over the entire communication hierarchy. Both of the above objectives are important in the sensornet context (e.g., for maximizing the lifetime of a sensor network) as well as more traditional distributed network-monitoring scenarios. To simplify, the analysis that follows, assume a regular hierarchical-monitoring topology, where both (a) the branching factor (i.e., number of siblings) and (b) the number of observed updates for a node at level I are fixed at $k_l$ and $N_l$, respectively. (The analysis can also provide some guidance for effective heuristics for setting the deviation parameters in scenarios that are more general.) From the analysis above, the (worst-case) transmission costs for a node at level I is $$O\left(\frac{\sqrt{k_l}}{\theta_l^3} \log\left(\frac{k}{\delta}\right) \log N_l\right).$$

Maximum Transmission Cost Minimization Problem

Determine $\theta_l$'s that minimize $\max_l$ $$\left\{\frac{\sqrt{k_l}}{\theta_l^3} \log\left(\frac{k_l}{\delta}\right) \log N_l\right\}$$

subject to the total-error constraint $\xi_l \theta_l = \theta$.

For this minimization problem, the optimal point occurs when the per-node transmission costs at all levels are equal, giving the optimal per-level $\theta_l$ settings $$\theta_l = \frac{\theta\left(\sqrt{k_l} \log\left(\frac{k_l}{\delta}\right) \log N_l\right)^{\frac{1}{3}}}{\sum_j \left(\sqrt{k_j} \log\left(\frac{k_j}{\delta}\right) \log N_j\right)^{\frac{1}{3}}}.$$

In the case of minimizing total communication, the per-node transmission costs at level I are multiplied by the total number of nodes at that level $K_l = \Pi_{j=1}^{l} k_j$, giving a sum objective function. This is a more complicated minimization problem, but a closed-form solution for the optimal $\theta_l$ settings is provided.

Aggregate Communication Cost Minimization Problem

Determine $\theta_l$'s that minimize the sum $$\sum_l \frac{K_l \sqrt{k_l}}{\theta_l^3} \log\left(\frac{k_j}{\delta}\right) \log N_l$$

subject to the total-error constraint $\xi_l \theta_l = \theta$.

Theorem 9

The optimal $\theta_l$ values for minimizing the (worst-case) aggregate communication cost over a (regular) multi-level tracking hierarchy are given by $$\theta_l = \frac{\theta\left(K_l \sqrt{k_l} \log\left(\frac{k_l}{\delta}\right) \log N_l\right)^{\frac{1}{4}}}{\sum_j \left(K_j \sqrt{k_j} \log\left(\frac{k_j}{\delta}\right) \log N_j\right)^{\frac{1}{3}}}.$$

Proof. Let $$c_l = K_l \sqrt{k_l} \log\left(\frac{k_l}{\delta}\right) \log N_l$$

for all levels I. This proof uses Hölder's Inequality, which states that, for any $x_l, y_l \geq 0$ and $p, q > 1$, such that $$\frac{1}{p} + \frac{1}{q} = 1:$$

$$\left(\sum_l x_l^p\right)^{\frac{1}{p}} \cdot \left(\sum_l y_l^p\right)^{\frac{1}{q}} \geq \sum_l x_l y_l,$$

with equality holding only if $y_l = \lambda \cdot x_l^{p-1}$ for all I.

Substituting $$p = 4, q = \frac{4}{3}, x_l = \left(\frac{c_l}{\theta_l^3}\right)^{\frac{1}{4}}, \text{ and } y_l = \theta_l^{\frac{3}{4}}$$

in Hölder's Inequality, $$\left(\sum_l \frac{c_l}{\theta_l^3}\right)^{\frac{1}{4}} \cdot \left(\sum_l \theta_l\right)^{\frac{3}{4}} \geq \sum_l c_l^{\frac{1}{4}},$$

or, equivalently (because $$\sum_l \theta_l = \theta \Bigg\}, \sum_l \frac{c_l}{\theta_l^3} \geq \frac{1}{\theta_l^3} \left( \sum_l c_l^{\frac{1}{4}} \right)^4.$$

Note that the left-hand side of this inequality is precisely the optimization objective, whereas the right-hand side is constant. Thus, the optimal (i.e., minimum) value for the objective occurs when equality holds in this instance of Hölder's Inequality, or equivalently, if $$\theta_l^{\frac{3}{4}} = \lambda \left( \frac{c_l}{\theta_l^3} \right)^{\frac{3}{4}},$$

which after some simplification, gives $$\lambda' = \lambda^{\frac{1}{3}} \Big).$$

(where the new proportionality constant is $$\theta_l = \lambda' c_l^{\frac{1}{4}}$$

Coupled with the total error constraint $\xi_l \theta_0 = \theta$, this directly implies that the optimal $\theta_l$ values are given by $$\theta_l = \theta c_l^{\frac{1}{4}}.$$

The result follows.

Alternate Sketch-Prediction Models

Three distinct approaches to sketch prediction have been outlined, each building progressively richer models to attempt to capture the behavior of local stream distributions over time. The most sophisticated model explicitly tries to model both first-order (i.e., "velocity") and second-order (i.e., "acceleration") effects in the local update-stream rates while increasing the amount of sketching information communicated to the coordinator by a factor of only two. Other models of evolving local distributions may be translated into predicted sketches by applying the linearity properties of the sketch transformation. While the models described operate on whole sketches at a time; however, it is possible to design "finer-grained" models that consider different parts of the distribution and model their movements separately (e.g., tracking an acceleration model), while using a sketch only for tracking the remainder of the distribution. Once a local constraint is violated, then it may be possible to restore the constraint by only shipping information on some of the heavy-hitter items, instead of shipping an entire sketch—clearly, this may drastically reduce the amount of communication required.

Experimental Study

An experimental study was conducted on the proposed tracking algorithms, to understand the effect of setting various parameters ($\epsilon, \theta$, and window W for the velocity/acceleration model), to evaluate the communication savings from the method, compared to the baseline solution of each remote site communicating every update to the coordinator site. The overall accuracy of the approximate methods was tested by comparing to the exact answer for various queries, and the benefits of using the fast update technique were analyzed.

Testbed and Methodology

A test system was implemented that simulated running protocols in C. Throughout, the probability of failure was set at $\delta=1\%$. Experiments were run on a single machine, simulating the actions of each of k sites and the coordinator. For each experimental simulation, all remote sites used the same class of prediction model (static, linear-growth or velocity/acceleration) with the same tracking parameters $\epsilon, \theta$. Various optimizations of the methods were implemented. When each site had to communicate to the coordinator, it computed whether it was more efficient to send a sketch or to send the updates since the last communication and sent the cheaper message. Because the coordinator has the previous sketch, it could compute the new sketch by adding on the recent updates, so both the remote site and the coordinator stayed in lockstep. This ensured that the cost was never worse than the trivial solution of sending every update to the coordinator. In the early stages in the protocol, when the site was still learning the nature of its streams, the coordinator was updated often.

The results of the experiments were reported for two data sets. The first was drawn from an Internet Traffic Archive representing HTTP requests sent to servers hosting the World Cup 1998 Web Site. Servers were hosted in four geographic locations: Plano, Tex.; Herndon, Va.; Santa Clara, Calif.; and Paris, France. Therefore, this system was modeled with four remote sites, one handling requests to each location. The relations defined by this sequence of requests were tracked using the "objectID" attribute as the attribute of interest. This seemed to be a good approximation of many typical data sets, taking on a large number of possible values with a non-uniform distribution. The second data set consisted of SNMP network usage data obtained from the Community Resource for Archiving Wireless Data at Dartmouth (CRAWDAD). It consists of measurements of total network communication every five minutes over a four-month period at a large number of different access points (approximately 200). These access points were divided into eight groups to create a data set with eight sites and 6.4 million total requests. The "size" attribute was used as the one on which to index the data, because this took a very large number of values, and it would have been challenging to predict the distribution accurately. Similar results were obtained to those reported when using different data sets and settings.

Throughout the experiments, the communication cost was measured as the ratio between the total communications used by a protocol (in bytes). For example, if the protocol sent 3 sketches, each of which was 10 KB in size, to summarize a set of 50,000 updates, each of which can be represented as a 32-bit integer, then the communication costs was computed as 15%. The goal was to drive these costs as low as possible. When measuring the accuracy of the methods, an estimated result, est, was computed and (for testing) the exact answer, true, was computed. The error was then given by $$\frac{|\text{true} - est|}{\text{true}},$$

which gives a fraction, 0% being perfect accuracy; again, the goal was to see this error as low as possible.

Setting Parameters and Tradeoffs

The tradeoff between parameters $\epsilon$ and $\theta$ was first investigated to guarantee a given global error bound, and the setting of the parameter W for the velocity/acceleration model. One day of HTTP requests were taken from the World Cup data set, which yielded a total of 14 million requests, and the complete SNMP data.

Figure 7B:
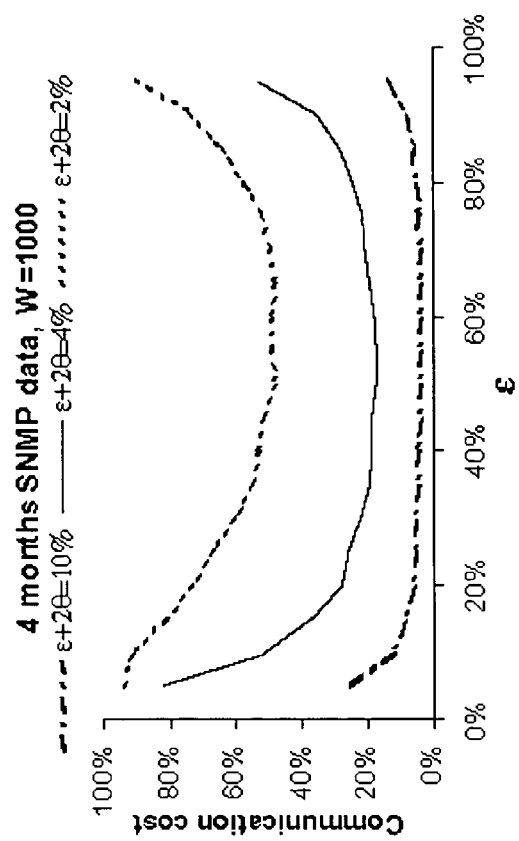
FIG. 7B is a chart of the tradeoff between parameters $\epsilon$ and $\theta$ for the simple network management protocol (SNMP) data set in the experimental study.
Figure 7A:
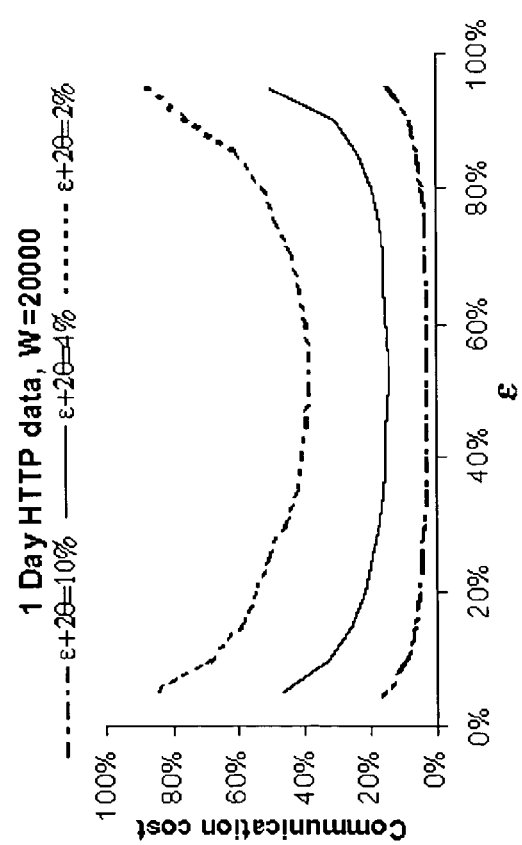
FIG. 7A is a chart of the tradeoff between parameters $\epsilon$ and $\theta$ for the hypertext transfer protocol (HTTP) data set in an experimental study.

FIGS. 7A and 7B show the effect of varying $\epsilon$ and $\theta$ subject to $\epsilon+2\theta=\phi$, for $\phi=10\%$, 4% and 2% error rate. In each case, it was verified that the total error was indeed less than $\phi$. The communication cost was minimized for $\epsilon$ roughly equal to $0.55-0.6\phi$. The analysis of sketch-prediction models showed that for a worst case distribution under the static model, $\epsilon$ should be around $0.66\phi$. In practice, it seemed that a slightly different balance gave the lowest costs, although the tradeoff curve was very flat-bottomed, and setting $\epsilon$ between $0.3\phi$ and $0.7\phi$ gave similar bounds. The curves for the velocity/acceleration model with W=20,00 on the HTTP data and W=1,000 on the SNMP data; curves for the different models and different settings of W looked similar. For the remainder of the experiments, $\epsilon=0.5\phi$ and $\phi=0.25\phi$ were set, giving $g(\epsilon,\theta)\approx\phi$.

Figures 8A, 8B:
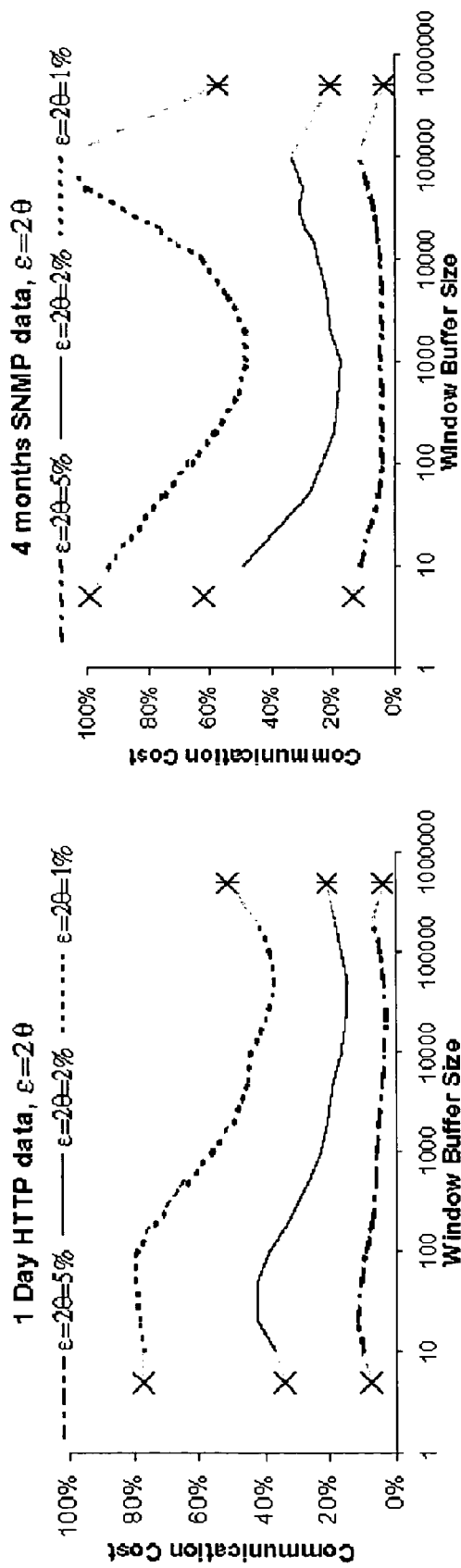
FIG. 8A is a chart of the effect of varying the window size used to estimate the "velocity" sketch for the HTTP data set in the experimental study.
FIG. 8B is a chart of the effect of varying the window size used to estimate the "velocity" sketch for the SNMP data set in the experimental study.

FIGS. 8A and 8B show the effect of varying the window size W for the velocity/acceleration model on the communication cost for three values of $\phi=\epsilon+2\theta$ on both data sets. In order to show all three models on the same graph, the static model costs was shown as the leftmost point (plotted with a cross), because this can be though of as the velocity/acceleration model with no history used to predict velocity. Similarly, the cost of the linear growth model was plotted as the rightmost point on each curve (marked with an asterisk), because this can be thought of as using the whole history to predict velocity. On the HTTP World Cup data (FIG. 8A), for the best setting of the window size, the velocity/acceleration model outperformed both of the other models by at least a third, but it was sensitive to the setting of W: too small or too large, and the overall communication cost was noticeably worse than the vest value. For each curve, the least cost was between a half and a third of the greatest cost for that curve. The static model got close to the worst cost, while the linear growth model did quite well, but still about a third more than the best velocity/acceleration model.

For the HTTP data set, irrespective of the $g(\epsilon,\theta)$ value, the best setting of W was in the range 10,000-100,000. Similar behavior was observed on the SNMP data, although the benefits of using a window over the linear growth model decreased as $\epsilon$ decreased. For the remainder of the experiments, the focus was on the velocity/acceleration model with W=20,000 for the HTTP data and W=1,000 for the SNMP data.

Communication Cost

Figures 9A, 9B:
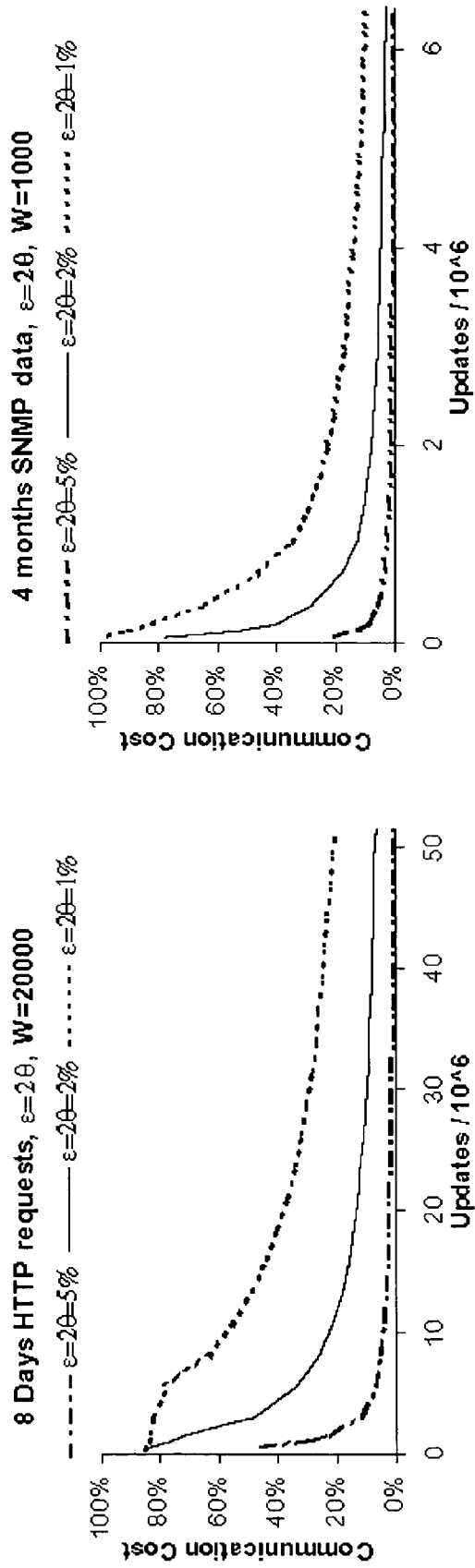
FIG. 9A is a chart of the communication cost as the number of updates increased for the HTTP data set in the experimental study.
FIG. 9B is a chart of the communication cost as the number of updates increased for the SNMP data set in the experimental study.

FIGS. 9A and 9B show how the communication cost evolved with time, using an exemplary embodiment of the velocity/acceleration model. This experiment was performed on a larger data set from a week of HTTP requests to the World Cup data sets, totaling over 50 million updates (with k=4 as before), and on the same Dartmouth SNMP data set treated as updates to a single site (so k=1). For both data sets, the behavior was similar. The cost was initially high, as the remote site adapted to the stream, but as the number of updates increased, then the requirement for communications dropped. For the higher error bounds, there were long periods of stability, i.e., where no communication was necessary. This implied that in the long term, the methods reach a "steady state", where no communication is necessary, and large savings result over shipping up every update to the coordinator.

Accuracy of Approximate Query Answers

Figure 10B:
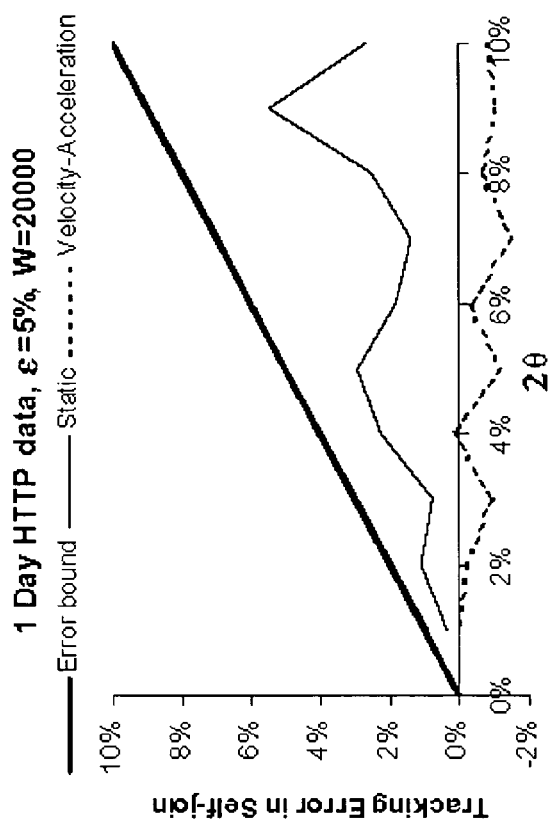
FIG. 10B is a chart of an estimation of quality due to tracking delay with sketch error subtracted as θ varies in the experimental study.
Figure 10A:
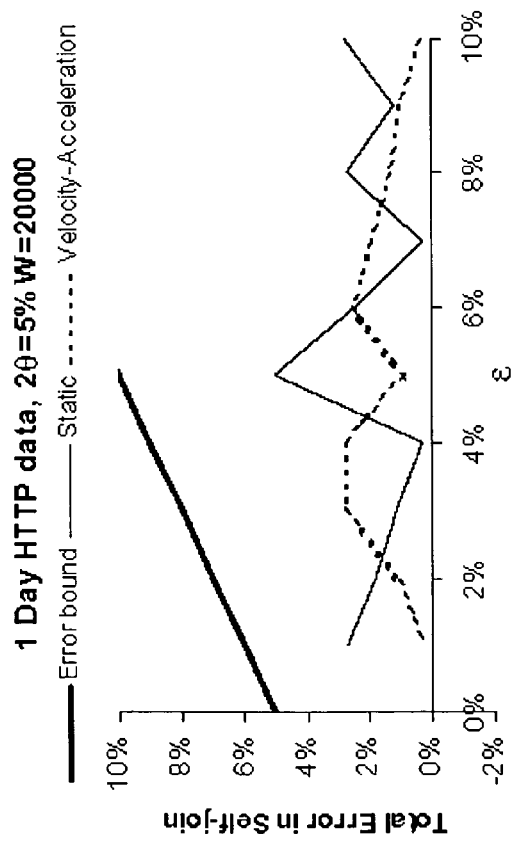
FIG. 10A is a chart of an evaluation of the quality with a fixed $\theta$ and a varying $\epsilon$ in the experimental study.

The first set of experiments focused on the communication cost of our proposed protocols. Then, the focused changed to the accuracy they provided for answering queries at the coordinator and the time cost at the remote sites. FIGS. 10A and 10B plot the error in answering queries at the coordinator based on processing the one day of data from the World Cup data set. For a fixed $\theta$, the observed accuracy is plotted for computing the size of a self-join as $\epsilon$ varied when all of the updates were processed. A heavy line shows the worst-case error bound $\epsilon+2\theta\approx g(\epsilon,\theta)$: all the results fell well within this bound. Both static and velocity/acceleration models gave similar errors at the coordinator. There was some variability in the error with different values of $\epsilon$, which arose from two sources: (1) variation due to the sketch error bound $\epsilon$ and (2) variation from the tracking bound $\theta$. Depending on when the query was posed, the remote site might have been using little of the "slack" that this bound gives or it might have been using almost all of it. Therefore, it is not expected to see any overall trend as $\epsilon$ varies, beyond that the total error is within the global guarantee.

In FIG. 10B, it was attempted to separate the sketch error from the tracking error, by computing the approximation we would have if the remote site had sent the sketch of its current distribution to the coordinator when the self-join query was posed. In FIG. 10B, the error was subtracted from the total error to give an indication of how much error was due to tracking as $\theta$ varied. The negative values seen in the results for the velocity/acceleration model indicated that the answer given by using the prediction model at the coordinator was actually more accurate than if the coordinator had requested each site to send it a sketch at query time. This showed an unexpected benefit. The worst-case bounds assume that the error from sketching and tracking are additive, but, in some cases, these error can partially cancel out. For the static case, the trend for the tracking error to decrease as $\theta$ decreased to zero was more clearly seen, thus guaranteeing that it met the error bound.

Timing Results

Figures 11A, 11B:
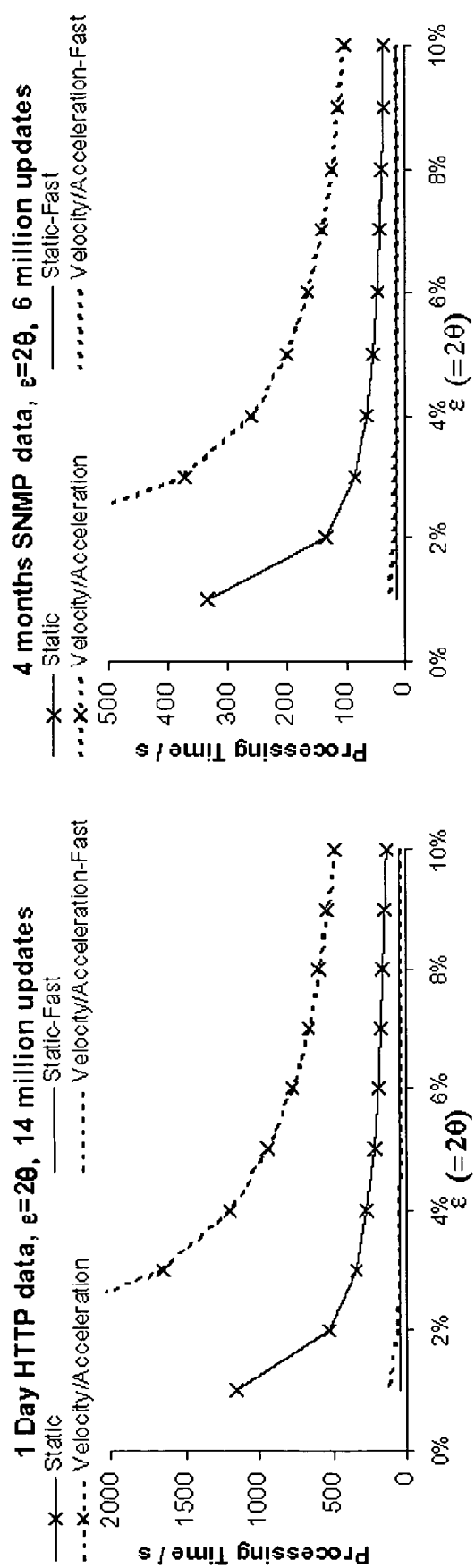
FIG. 11A is a chart of timing cost for the HTTP data set, comparing fast tracking methods to performing sketch estimation every step, for static and acceleration models in the experimental study.
FIG. 11B is a chart of timing cost for the SNMP data set, comparing fast tracking methods to performing sketch estimation every step, for static and acceleration models in the experimental study.

Lastly, the time cost of the tracking methods was considered. The implementation of the methods using Fast-AGMS sketches and the fast sketch-tracking scheme was compared against the same prediction models implemented with a naive tracking method with time complexity linear in the sketch size (FIGS. 11A and 11B). The communication cost and accuracy of both versions was the same in all cases: the fast tracking techniques computed the same functions, but were designed to work more quickly. The time cost was composed of the time required to update each sketch, and the time to recompute the sketch model when the error bounds are exceeded. For the "slow" implementation, the former requires time linear in the size of the sketch, which is in turn quadratic in $1/\epsilon$; for the "fast" version, the cost is independent of $\epsilon$. As shown, the direct implementations of the tracking methods rose sharply as $\epsilon$ approached zero, while the fast implementations hardly varied. For small $\epsilon$, the fast velocity/acceleration methods became more expensive, because, while update operations were still fast, recomputing the sketches when tracking bounds were broken began to contribute more significantly to the overall cost. For $\epsilon \geq 3\%$ on the World Cup HTTP data (FIG. 11A), the cost was 36 seconds in the static case and 50 seconds for the more complex velocity/acceleration model to process all 14 million updates. This gave an effective processing rate of around 300-400 thousand updates per second per site, which was equivalent to an average overhead of three microseconds per update on the experimental setup (i.e., 2.4 GHz Pentium desktop computer). A similar rate was observed on the Dartmouth SNMP data (FIG. 11B).

Experimental Conclusion

The experiments showed that significant communication savings were possible for the variety of tracking problems based on the key sketch-tracking problem that was addressed. With an approximation factor of 10%, the communication cost was less than about 3% of sending every update directly to the coordinator, and this savings increased as more updated were processed. Time overhead was minimal: a few microseconds to update the necessary tracking structures, and typically a few kilobytes per sketch, plus space to store a recent history of updates. The more detailed sketch prediction models seemed to offer significant improvements over the simplest model. The velocity/accleration model gave the best performance, if enough information about the streams was known to choose a good setting of the window parameter W. Other embodiments may have a more involved algorithm that tires several values of W in parallel and eventually settle on the one that minimizes communication. Failing this, linear growth provides adequate results and requires no extra parameters to be set.

Conclusion

Exemplary embodiments present novel algorithms for tracking complex queries over multiple streams in a general distributed setting. The schemes are optimized for tracking high-speed streams and result in very low processing and communication costs, and provide significant savings over naive updating schemes. The results showed that any query that can be answered using sketches in the centralized model could be tracked efficiently in the distributed model, with low space, time, and communication needs.

The results showed that join, multi-join and self-join queries could be answered with guaranteed error bounds provided remote sites track conditions that depend only on individual streams observed locally. With appropriate models predicting future behavior based on a collected history, little communication is needed between the remote sites and the coordinator site. A wide rage of queries can be answered by the coordinator: essentially, any query that can be approximated using $\epsilon$-approximate sketches can now be answered with $g(\epsilon,\theta)$ error, including heavy hitters, wavelets, and multi-dimensional histograms.

Figure 12:
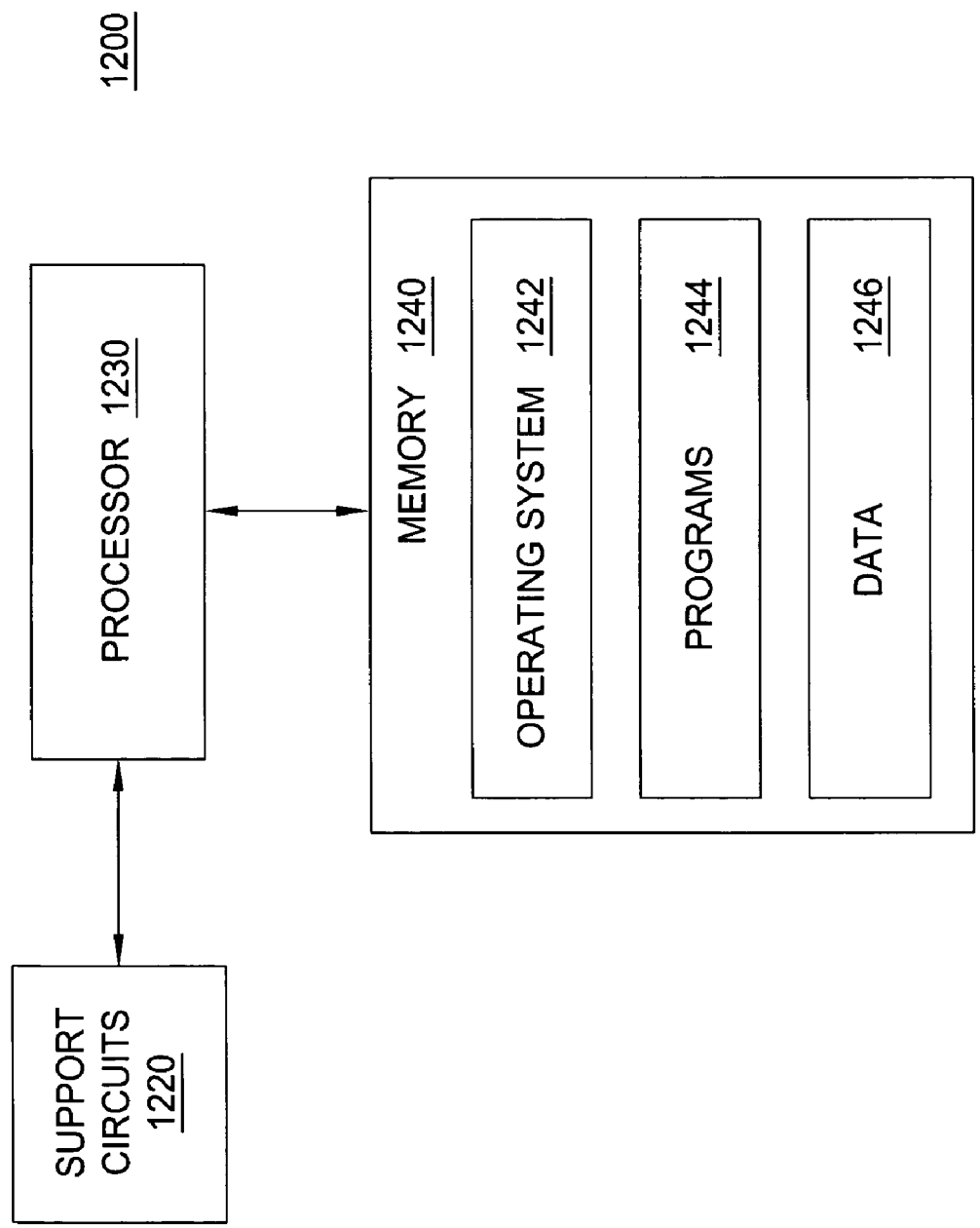
FIG. 12 is a high-level block diagram showing a computer. To facilitate understanding, identical reference numerals have been used, where possible, to designate identical elements that are common to the figures.

FIG. 12 is a high-level block diagram showing a computer. The computer 1200 may be employed to implement embodiments of the present invention. The computer 1200 comprises a processor 1230 as well as memory 1240 for storing various programs 1244 and data 1246. The memory 1240 may also store an operating system 1242 supporting the programs 1244.

The processor 1230 cooperates with conventional support circuitry such as power supplies, clock circuits, cache memory and the like as well as circuits that assist in executing the software routines stored in the memory 1240. As such, it is contemplated that some of the steps discussed herein as software methods may be implemented within hardware, for example, as circuitry that cooperates with the processor 1230 to perform various method steps. The computer 1200 also contains input/output (I/O) circuitry that forms an interface between the various functional elements communicating with the computer 1200.

Although the computer 1200 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal-bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for tracking, comprising:
   monitoring a plurality of local update streams by a plurality of monitoring sites, each monitoring site tracks any deviation of a local distribution from a predicted distribution using a sketch prediction model, the local update streams being part of a global data distribution in a distributed system;
   sending a state update message from each monitoring site to a coordinator only when the local distribution differs from the predicted distribution by more than a predetermined amount, the state update message including a predicted sketch derived from the sketch prediction model wherein a fast-AGMS sketch is used to track any deviation of the local distribution from the predicted distribution by averaging over partitions of a domain generated randomly through a hash function, the fast-AGMS sketch including a plurality of counters arranged in a plurality of hash tables, each hash table having a plurality of hash buckets; and
   providing an approximation at a coordinator based on the state update messages from the monitoring sites.

2. The method of claim 1, wherein the sketch prediction model is one of: a static model, a linear-growth model, and a velocity/acceleration model.

3. The method of claim 1, wherein the monitoring sites perform substantially continuously monitoring.

4. The method of claim 1, wherein the approximation is an answer in response to a user query, the user query is one of a join query and multi-join query.

5. The method of claim 1, wherein the approximation is computed substantially continuously.

6. An apparatus, comprising:
   means for receiving state update messages from a plurality of monitoring sites monitoring a respective plurality of local update streams that are part of a global data distribution in a distributed system, each monitoring site tracks any deviation of a local distribution from a predicted distribution using a sketch prediction model, each state update message including a predicted sketch and being received only when the local distribution at a respective monitoring site differs from the predicted distribution by more than a predetermined amount wherein a fast-AGMS sketch is used to track any deviation of the local distribution from the predicted distribution by averaging over partitions of a domain generated randomly through a hash function, the fast-AGMS sketch including a plurality of counters arranged in a plurality of hash tables, each hash table having a plurality of hash buckets; and means for providing an approximation based on the state update messages from the plurality of monitoring sites.

7. The apparatus of claim 6, wherein each monitoring site tracks any deviation of the local distribution from the predicted distribution using a sketch prediction model.

8. The apparatus of claim 7, wherein the sketch prediction model is one of: a static model, a linear-growth model, and a velocity/acceleration model.

9. The apparatus of claim 6, wherein the approximation is computed substantially continuously.

10. The apparatus of claim 6, wherein the approximation is an answer in response to a user query.

11. The apparatus of claim 10, wherein the user query is one of a join query and multi join query.

12. A computer readable storage medium storing instructions for performing a method of tracking, the method comprising:

monitoring a plurality of local update streams by a plurality of monitoring sites, each monitoring site tracks any deviation of a local distribution from a predicted distribution using a sketch prediction model, the local update streams being part of a global data distribution in a distributed system; and sending a state update message from each monitoring site to a coordinator only when the local distribution differs from the predicted distribution by more than a predetermined amount, the state update message including a predicted sketch derived from a sketch prediction model wherein a fast-AGMS sketch is used to track any deviation of the local distribution from the predicted distribution by averaging over partitions of a domain generated randomly through a hash function, the fast-AGMS sketch including a plurality of counters arranged in a plurality of hash tables, each hash table having a plurality of hash buckets.

13. The computer readable storage medium of claim 12, wherein each monitoring site tracks any deviation of the local distribution from the predicted distribution using a sketch prediction model.

14. The computer readable storage medium of claim 13, wherein the sketch prediction model is one of: a static model, a linear-growth model, and a velocity/acceleration model.

15. The computer readable storage medium of claim 12, wherein the monitoring sites perform substantially continuously monitoring.

16. A computer readable storage medium storing instructions for performing a method of tracking, the method comprising:

receiving a state update message from each of a plurality of monitoring sites only when a local distribution at the monitoring site differs from a predicted distribution by more than a predetermined amount, the state update message including a predicted sketch derived from a sketch prediction model wherein a fast-AGMS sketch is used to track any deviation of the local distribution from the predicted distribution by averaging over partitions of a domain generated randomly through a hash function, the fast-AGMS sketch including a plurality of counters arranged in a plurality of hash tables, each hash table having a plurality of hash buckets, the state update messages reflecting local update streams that are part of a global data distribution system; and providing, in response to a user query, an approximation determined based on the state update messages received from the plurality of monitoring sites wherein each monitoring site tracks any deviation of the local distribution from the predicted distribution using a sketch prediction model.

17. The computer readable storage medium of claim 16, wherein the user query is one of a join query and multi-join query.

18. The computer readable storage medium of claim 16, wherein the approximation is computed substantially continuously.

* * * * *